United States Patent [19]
Moreira

[11] Patent Number: 5,883,490
[45] Date of Patent: Mar. 16, 1999

[54] ELECTRIC MOTOR CONTROLLER AND METHOD

[76] Inventor: Julio C. Moreira, 4643 Hedgewood Dr., Stevensville, Mich. 49127

[21] Appl. No.: 837,662

[22] Filed: Apr. 22, 1997

Related U.S. Application Data

[60] Provisional application No. 60/019,749 Jun. 14, 1996.

[51] Int. Cl.[6] .................................................. H02P 7/628
[52] U.S. Cl. .......................... 318/807; 318/772; 318/781; 318/810; 318/811
[58] Field of Search .................................... 318/727, 772, 318/778, 781, 779, 785, 786, 789, 793–796, 798–801, 807, 808, 810, 811

[56] References Cited

U.S. PATENT DOCUMENTS

| | | | |
|---|---|---|---|
| 3,588,650 | 6/1971 | Bevis . | |
| 4,099,108 | 7/1978 | Okawa et al. . | |
| 4,243,927 | 1/1981 | D'Atre | 318/803 |
| 4,281,276 | 7/1981 | Cutler et al. | 318/798 |
| 4,357,655 | 11/1982 | Beck | 318/811 X |
| 4,375,612 | 3/1983 | Wirth | 318/767 |
| 4,446,706 | 5/1984 | Hartwig | 68/24 |
| 4,465,961 | 8/1984 | Landino | 318/811 |
| 4,466,052 | 8/1984 | Thrap | 363/41 |
| 4,467,257 | 8/1984 | Douthart et al. | 318/774 |
| 4,488,102 | 12/1984 | Sams et al. | 318/810 |
| 4,566,289 | 1/1986 | Iizuka et al. | 62/228.4 |
| 4,651,079 | 3/1987 | Wills | 318/811 |
| 4,706,180 | 11/1987 | Wills | 363/41 |
| 4,767,976 | 8/1988 | Mutoh et al. | 318/808 |
| 4,926,104 | 5/1990 | King et al. | 318/599 |
| 5,179,336 | 1/1993 | Orgovan | 318/758 |
| 5,214,367 | 5/1993 | Uesugi | 318/803 |
| 5,241,257 | 8/1993 | Nordby et al. | 318/811 |
| 5,252,905 | 10/1993 | Wills et al. | 318/807 |
| 5,276,392 | 1/1994 | Beckerman et al. | 318/751 |
| 5,325,034 | 6/1994 | Reynolds | 318/782 |
| 5,350,992 | 9/1994 | Colter | 318/807 |
| 5,422,557 | 6/1995 | Lee et al. | 318/807 |

FOREIGN PATENT DOCUMENTS

| | | |
|---|---|---|
| 0499470 | 8/1992 | European Pat. Off. . |
| 8714498 | 12/1987 | Germany . |
| 3908882 | 9/1990 | Germany . |
| 4322223 | 1/1995 | Germany . |
| 82-110825 | 6/1982 | Japan . |
| 2120868 | 12/1983 | United Kingdom . |

OTHER PUBLICATIONS

K. Walters. "Speed Control for Asynchronous Motors", Elektor Electronics, pp. 29–31, Feb. 1989. London, Great Britian.

*Primary Examiner*—Bentsu Ro

[57] ABSTRACT

A motor controller for a single phase induction motor (SPIM), wherein the SPIM is driven by a square wave above or below rated frequencies. The square wave may be shaped by introducing one or more notches to eliminate or suppress undesirable harmonics, to reduce the amplitude of the fundamental, to provide desirable voltage control, or to provide desirable voltage to frequency control. The control topology may include switches, main winding taps and switchable capacitors to accommodate selection between line and square wave driving, temporary capacitance increases, or other advantages.

5 Claims, 18 Drawing Sheets

ELECTRIC MOTOR CONTROLLER AND METHOD

This application claims the benefit of U.S. Provisional Application Ser. No. 60/019,749, filed on Jun. 14, 1996.

BACKGROUND OF THE INVENTION

1. Field of the Invention

The present invention generally is directed to means and methods for controlling the speed and/or torque of motors. More specifically, the invention is directed to means and methods for controlling the speed and/or torque of single phase induction motors.

2. Description of the Related Art

Single phase induction motors (SPIMs) constitute the majority of motors used in home appliances today. SPIMs include permanent split capacitor (PSC) motors, split phase motors, permanent magnet synchronous motors, and shaded pole motors. As is known, these motors are inherently single speed motors and are used in clothes washers, clothes dryers, dishwashers, hermetic compressors, fans, pumps, draft inducers, et cetera.

SPIMs, generally are supplied power from an AC utility line at 50 or 60 Hz and at 120 or 230 volts. These motors typically have a power rating of between about 5 to about 1500 watts.

As mentioned above, these motors operate at constant speed when supplied from the AC utility line. When multiple speeds are needed, techniques like multiple windings with different number of poles, or tapped windings are used. In some applications, like fans, blowers, or pumps, the applied voltage to the motor can be reduced in order to reduce motor speed.

In industrial applications, three phase induction motors have been used instead of SPIMs due to the general availability of three phase power, as well as the higher output capabilities, higher torque production, higher efficiency and lower inrush currents of the three phase motors. Multiple speeds and torques typically are provided utilizing controllers that apply three phase power to the motors in such a fashion as to effect the variable speeds and/or torques. However, in residential appliances, SPIMs are preferred due to the greater availability of single phase power.

To date, the design of controllers for SPIMs has been greatly influenced by the design of industrial motor controllers. These influences range from developments in power electronics, motor design and control theory. In that regard, variable speed motors, notably induction motors, driven by hard switching three phase inverters are commonly used in industrial applications. However, as alluded to above, low cost, high efficiency, small size, and high production volume are not the main driving force behind industrial motor controller designs. Hence, most industrial motor control schemes are not adaptable for or matched to the appliance industry.

Oftentimes, a SPIM control system will convert fixed frequency AC power (e.g., 120 v, 60 Hz) to DC power, and then invert the DC power to suitable AC frequency power.

The following patents, incorporated herein by reference, disclose various means and methods for driving SPIMs: U.S. Pat. Nos. 4,446,706; 5,252,905; 4,467,257; 4,566,289; 5,214,367; 5,241,257; 3,588,650; 4,281,276; 4,243,927; 4,099,108; 4,488,102; 4,767,976; 5,179,336; and 5,276,392. While these patents disclose various schemes for driving SPIMs at various speeds, U.S. Pat. No. 5,252,905 discloses a variable frequency supply for operating a SPIM in which a Pulse Width Modulated (PWM sine wave is applied to the SPIM. The control circuit includes switches to bypass the electronic switching circuit when it is desired to operate the motor from the 60 Hz line supply. Also, U.S. Pat. No. 4,566,289 discloses a refrigerator control system including an inverter for operating the compressor motor at variable speeds, and switches for connecting the compressor motor directly to the line voltage supply when desired. Finally, U.S. Pat. No. 3,588,650 discloses a variable frequency and magnitude supply for operating a SPIM at variable speeds.

Thus far, control systems that convert fixed frequency AC power to DC power and then invert the DC power to a variable amplitude and frequency voltage to operate a single phase induction motor do not optimize the control for the characteristics of the motor over the full range of operating conditions. Very often the control will limit operating conditions such that the motor will not make audible noises or the control circuit components will not overheat. These controls will often limit their operation to signals of line frequency or less.

SUMMARY OF TE INVENTION

The present invention provides new means and methods for controlling the speed and/or torque of a single phase induction motor. To that end, the invention provides means and methods for operating a SPIM at rated, lower than rated and higher than rated frequencies. In doing so, the invention also provides a simple and reduced part count motor controller for appliances.

In particular, it has been discovered that SPIMs can be effectively driven by a square wave signal and that SPIMs are tolerant of the extra harmonics inherently provided by square wave signals. Depending on desired operating characteristics, the square wave may be shaped by suppressing or eliminating one or more harmonic components. Further, the motor topology may include variable capacitance, selective application of AC line power or the square wave, split phase, or tapped windings. Yet further, the overall system may include any combination of the foregoing.

In an embodiment, the invention provides a motor control system comprising a single phase induction motor; and a motor drive circuit configured to drive the motor at other than its rated frequency with a square wave motor drive signal.

In an embodiment, the invention provides that the motor drive circuit comprises a controllable power switching circuit and a controller coupled to the power switching circuit, the controller controlling switching of switches in the power switching circuit to generate the square wave motor drive signal.

In an embodiment, the invention provides that the controller is a programmable controller.

In an embodiment, the invention provides that the controller effectively generates the square wave motor drive signal such that one or more harmonics are suppressed and/or eliminated.

In an embodiment, the invention provides that the controller is configured to control the voltage of the square wave motor drive signal in accordance with a predetermined voltage to frequency ratio.

In an embodiment, the invention provides that the controller is configured to control the voltage to frequency ratio of the square wave motor drive signal such that the ratio is not constant.

In an embodiment, the invention provides that the motor drive is selectively coupled to the motor.

In an embodiment, the invention provides that the motor is a multi-pole motor.

In an embodiment, the invention provides that the motor is a permanent split capacitor motor.

In an embodiment, the invention provides that the controller is configured to at least partially suppress a frequency component of the square wave.

In an embodiment, the invention provides that the controller is configured to drive the motor at above and below rated frequencies.

In an embodiment, the invention provides a refrigeration system having a compressor driven by any of the above-mentioned systems.

In an embodiment, the invention provides a clothes washer having a wash tub driven by any of the systems mentioned above.

In an embodiment, the invention provides a method for controlling a single phase induction motor comprising the steps of:

a) connecting the motor to a motor drive;

b) generating a square wave drive signal with the motor drive;

c) applying the motor drive signal to the motor to operate the motor at other than rated frequency.

In an embodiment, the invention provides the further steps of suppressing one or more harmonics in the square wave motor drive signal by controlling generation of the drive signal.

In an embodiment, the invention provides the step of reducing the amplitude of the fundamental component of the square wave motor drive signal.

In an embodiment, the invention provides the step of maintaining a non-constant voltage to frequency ratio in the motor drive signal.

In an embodiment, the invention provides a motor controller for a single phase induction motor, comprising:

means for generating a square wave power signal; and means for controlling the shape of the square wave power signal and applying the shape controlled square wave power signal to the motor.

In an embodiment, the invention provides that the means for controlling the shape of the square wave comprises means for controlling the frequency of the square wave.

In an embodiment, the invention provides that the means for controlling the shape of the square wave comprises means for controlling the amplitude of the square wave.

In an embodiment, the invention provides that the means for controlling the square wave comprises means for suppressing selected frequency components of the square wave.

In an embodiment, the invention further comprises a switch to selectively apply the square wave or another power source to the motor.

In an embodiment the invention provides that the another power source is an alternating current power source used to power the means for generating the square wave.

In an embodiment, the invention further comprises the selective switching of winding capacitors as a function of the applied frequency in order to improve the motor performance at high speeds.

In an embodiment, the invention further comprises the selective switching of winding taps as a function of the applied frequency in order to improve motor performance at high speeds.

In an embodiment, the invention further comprises the selection of a proper voltage waveform that minimizes motor vibrations, acoustic noise and motor and controls overheating.

In an embodiment, the invention further applies square wave to the motor at higher than rated frequency in order to increase the available motor torque.

These and other features of the invention are discussed in greater detail below in the following detailed description of the presently preferred embodiments with reference to the accompanying drawings.

DESCRIPTION OF THE PREFERRED EMBODIMENT

Figure 1:
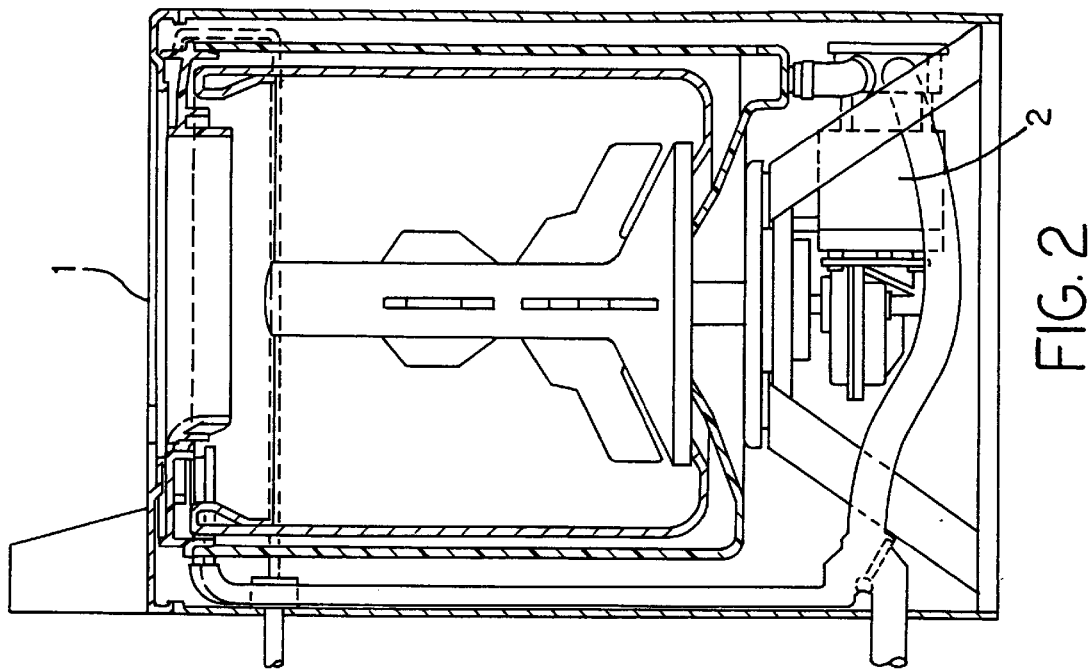
FIG. 1 illustrates a washer in perspective view, partially broken away.
Figure 2:
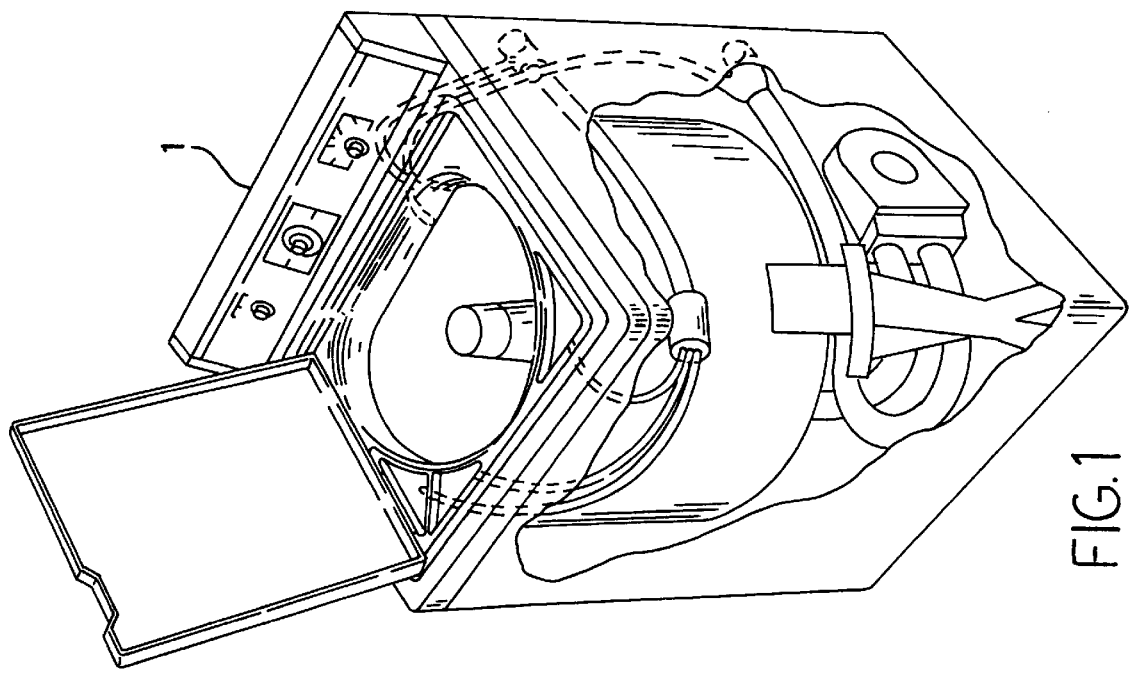
FIG. 2 illustrates a section of the washer of FIG. 1 in elevational view, revealing a single phase motor.

In FIG. 1, there is illustrated a washer 1 of the type in which a SPIM might be used in accordance with principles of the invention. FIG. 2 provides a side view of the washer, partially broken away, in order to reveal a SPIM 2. It is the configuration of a drive for the SPIM 2 as well as its interconnection with the SPIM 2 that is the focus of the disclosure. The remaining elements of such a washer are well known and, therefore, are not further specifically described herein. Although the invention is illustrated in the environment of a washer, the invention is applicable to any use of a SPIM.

The invention is generally directed to a SPIM control and its operation, which permits the normally single-speed SPIM to be operated as a variable speed motor or as a multi-speed motor, especially at speeds higher than the rated speed, without the need for special motor configurations, including extra poles. Also, the present invention makes use of the discovery that a SPIM can be driven effectively at greater than and lower than rated speeds using square wave drive signals whose fundamental frequencies are greater and lower, respectively, than the rated frequency of the motor.

Using a square wave to drive the SPM, especially at higher than rated speed, has many advantages over a sinusoidal or shaped waveform. One of the most important reasons is that there is more voltage available in the fundamental component of a square wave than other waveforms, which results in a higher motor breakdown torque, especially when operating at higher than rated speeds. The use of a square wave guarantees the maximum possible voltage.

Previously, non-shaped square waves have not been used to drive SPIMs because of the negative effects of acoustic noise, heat, and vibration. To use a square wave in lower than rated speed, pulse width modulation would have been used to shape the square wave more like a sinusoidal waveform in order to counter or avoid negative effects that otherwise might arise in the motor operation, such as acoustic noise and vibration. Unfortunately, the use of PWM reduces the maximum amplitude of the fundamental component of the waveform, resulting in lower voltage and consequently lower breakdown torque, which is especially disadvantageous at higher than rated speeds. Contrary to the result of using a square wave at lower than rated speeds, it has been found that SPIMs provide sufficient inherent filtering so as to tolerate driving by square wave signals at frequencies higher than rated, eliminating the need for PWM control.

Figure 3:
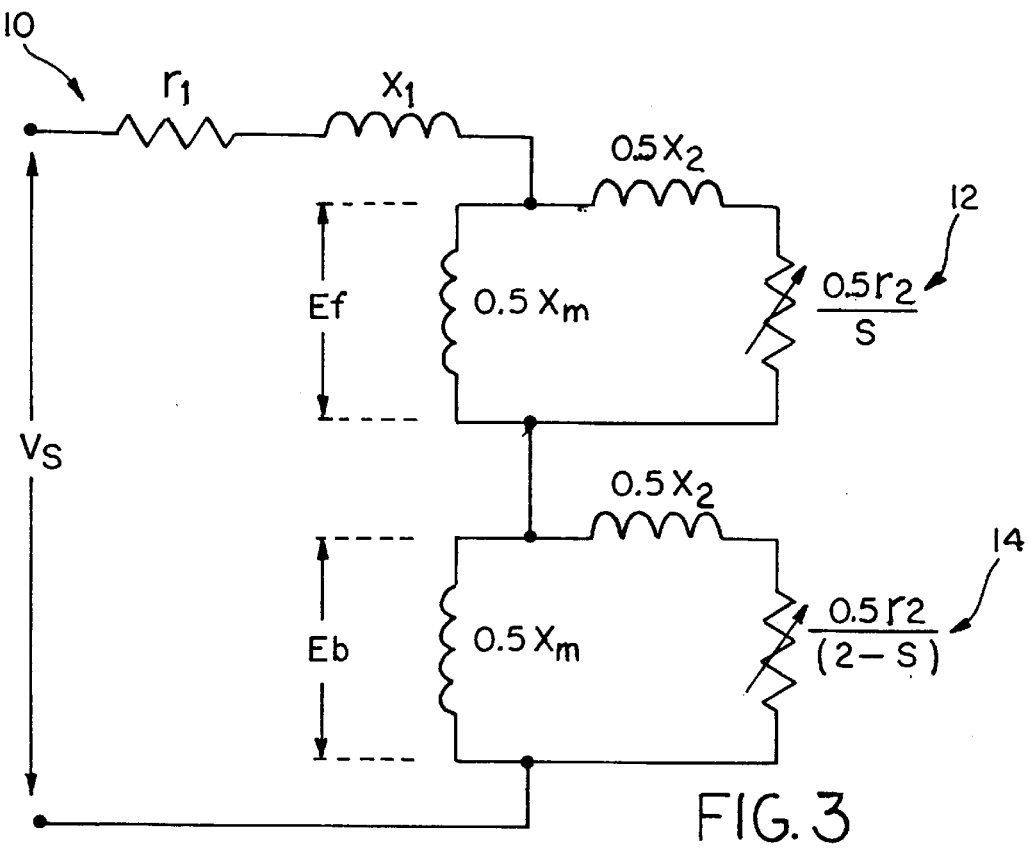
FIG. 3 illustrates an equivalent electric circuit model for a single phase induction motor during steady state operation.

In FIG. 3 there is illustrated an equivalent electric circuit 10 for a single phase induction motor during steady state operation. The noted motor parameters are: stator resistance $r_1$, stator leakage reactance $X_1$, magnetizing reactance $X_m$, rotor leakage reactance $X_2$, rotor resistance $r_2$, and slip S. The applied motor voltage Vs is divided into three components: Ef, Eb and the drop across the stator impedance ($r_1$, $X_1$). As can be appreciated, a SPIM is not a pure inductive circuit.

Figure 4:
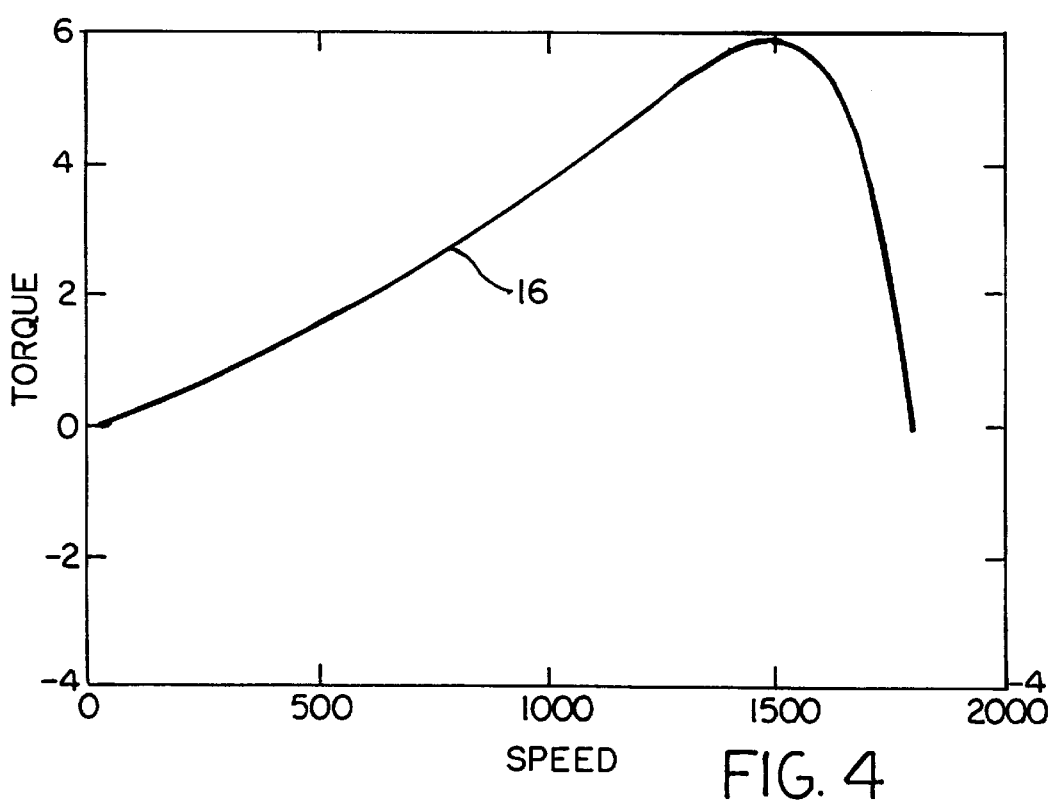
FIG. 4 illustrates the torque versus speed characteristic curve for a SPIM running single phase, i.e., without a starting or running capacitor.

The average steady state torque produced by the motor is a function of the slip value S and is illustrated in FIG. 4 by way of a torque versus speed curve 16.

The torque of a SPIM is generated by the interaction of two opposing magnetic field components, herein called forward and backward fields or components. The upper parallel branch 12 in FIG. 3 models the forward component while the lower parallel branch 14 models the backward component. Torque is produced when current circulates through the magnetizing inductance and through the rotor circuit. The internal voltages Ef and Eb set the magnetizing flux for the forward and backward components and clearly these voltages (angle and phase) are a function of the motor operating condition. The domination of one of the forward or backward component over the other component establishes the direction of the rotation of the motor. At rated frequency and voltage, the voltage Ef has a larger magnitude than the voltage Eb and the forward field dominates over the backward field.

At high slip values, the impedance of the two branches are equal as are Ef and Eb. This results in a condition where no torque is generated. However, as the applied frequency is decreased, the impedance of the two parallel branches is dominated by the rotor resistance and consequently lower torque also is produced by the motor for a given slip value due to the reduction of the voltage Ef with respect to the voltage Eb.

When slip S is zero, the forward component is zero because the rotor circuit is open, or $Z_{rf}=\infty$. A backward torque component (negative value) is, however, produced for S=0 since the backward rotor circuit impedance, $Z_{rb}$, becomes:

$$Z_{rb} = \frac{0.5\, r_2}{2} + j0.5 X_2 = \frac{r_2}{4} + \frac{jX_2}{2}$$

For a slip value equal to 1, both the forward and backward circuits present the same impedance. As stated mathematically:

$$Z_{rf}=Z_{rb}=0.5_{r_2}+j0.5_{X_2}$$

This implies that the two torque components have the same amplitude but opposite signs. The total resultant torque is zero for the condition S=1.

It is important to note that the influence of the backward field component on the torque as the slip varies from 0 to 1. The motor behavior for small values of slip is mainly dominated by the forward field. This implies that the motor has an approximate behavior to that of a three phase induction motor for small values of slip. Hence, the speed of a SPIM is a function of the supply frequency and slip.

Figure 5:
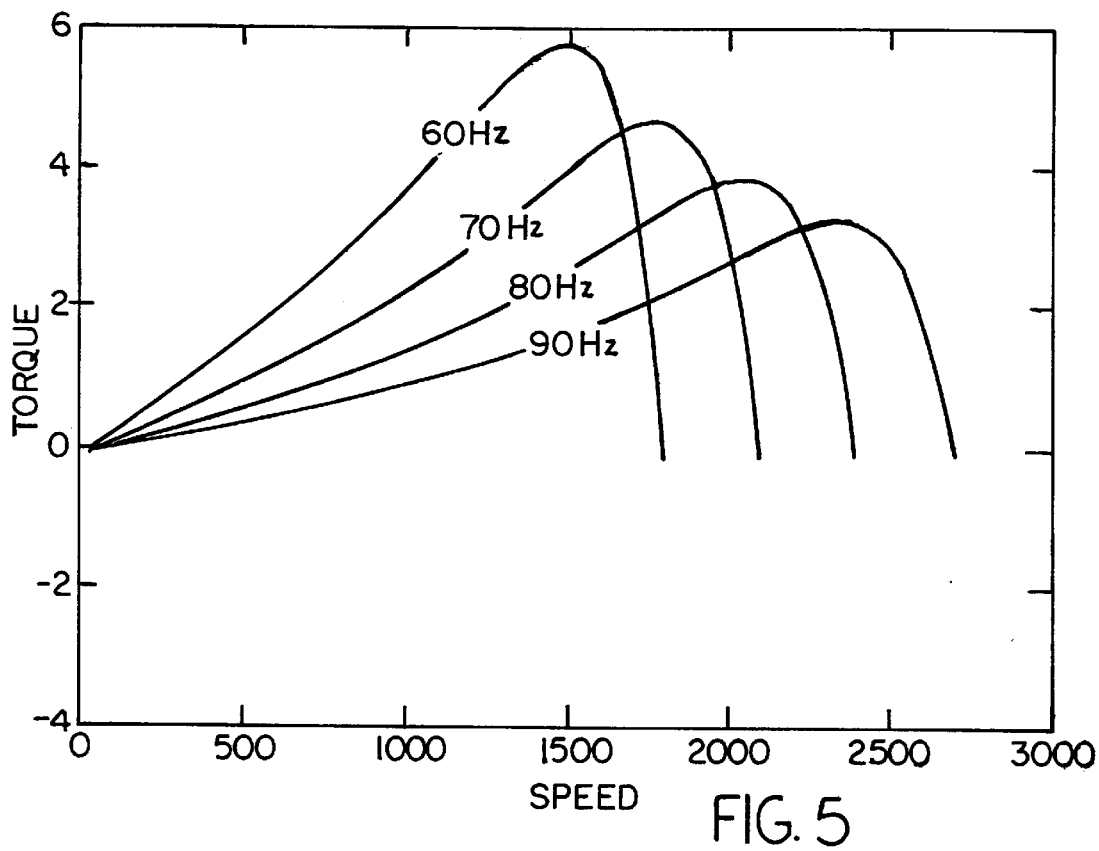
FIG. 5 illustrates torque versus speed curves for a SPIM as a function of supply frequencies of 60 Hz and greater.

In FIG. 5 there are illustrated torque versus speed curves for a SPIM operating single phase, i.e., without a running capacitor, for supply frequencies ranging from rated 60 Hz up to 90 Hz. The motor voltage amplitude was kept constant at its rated value (which is defined at 60 Hz), as the frequency was increased. As can be seen, for a given torque, the motor speed is a function of the supply frequency. As can also be seen, slip increases as the supply frequency increases for a constant load torque.

Figure 7:
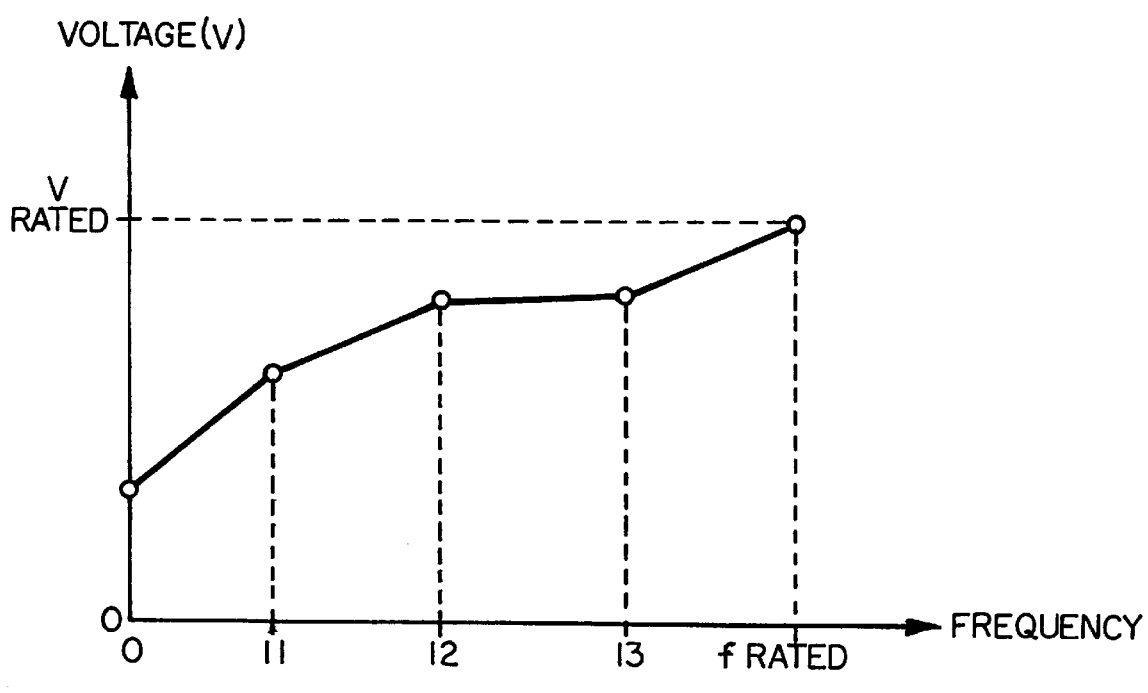
FIG. 7 illustrates a generic piece-wise linear voltage and frequency relationship used to generate the torque versus speed curves of FIG. 6.
Figure 6:
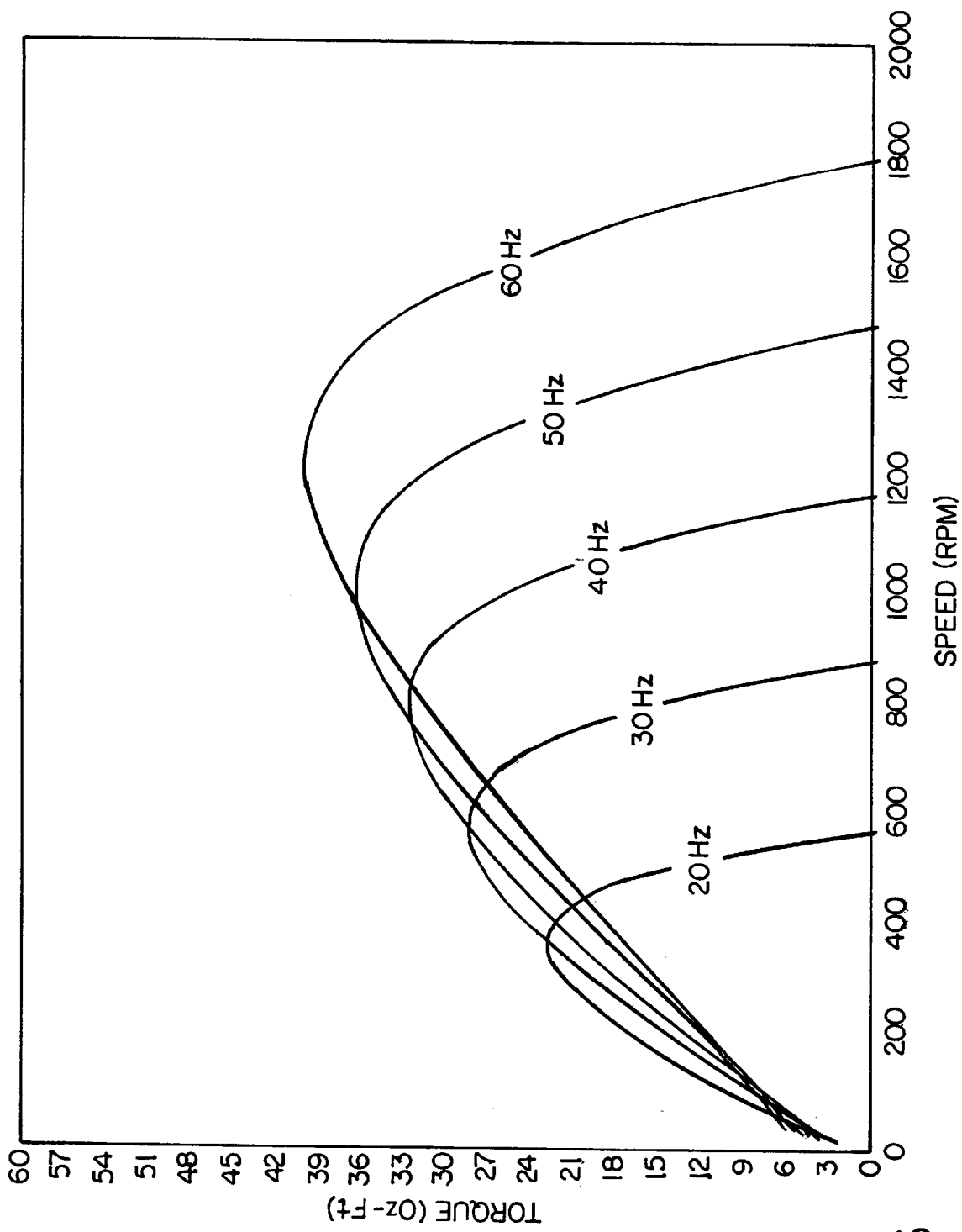
FIG. 6 illustrates torque versus speed curves for a SPIM as a function of supply frequencies of 60 Hz and lower.

Referring now to FIG. 6, other torque versus speed curves for a SPIM running single phase for supply frequencies ranging from rated 60 Hz down to 20 Hz are presented. The applied voltage amplitude was reduced proportionally with frequency so that the ratio of volts per hertz was kept constant to avoid magnetic saturation, in order to avoid excessive motor losses and performance degradation. The reduction in voltage with reduction in supply frequency serves to retain a constant magnetic flux. In the invention, it is preferred that the applied motor voltage follows a piece wise linear function, where each piece of the function is defined by a constant V/F (FIG. 7). Each linear segment is defined by two constants, and represented by: volts= k1*frequency+k2 for a frequency value between 0 and f1, for instance.

As illustrated (FIG. 5), the maximum available torque, or the breakdown torque, reduces as the frequency is increased. A smaller reduction in breakdown torque is also observable in three phase induction motors and that is due to the voltage drop in the stator impedance. But, in the single phase motor case, besides the voltage drop in the stator impedance, there is also a counter voltage induced by the backward component. The result is less voltage available for the forward component, and consequently, less torque. It is a challenge therefore to provide adequate torque as the supply frequency is increased. For the reasons set forth above regarding the relative reduction of Ef with respect to Eb with increasing of supply frequency, a non-constant applied voltage to supply frequency control is provided in accordance with principles of the invention in order to keep Ef and the maximum motor torque available as high as possible.

Figure 8:
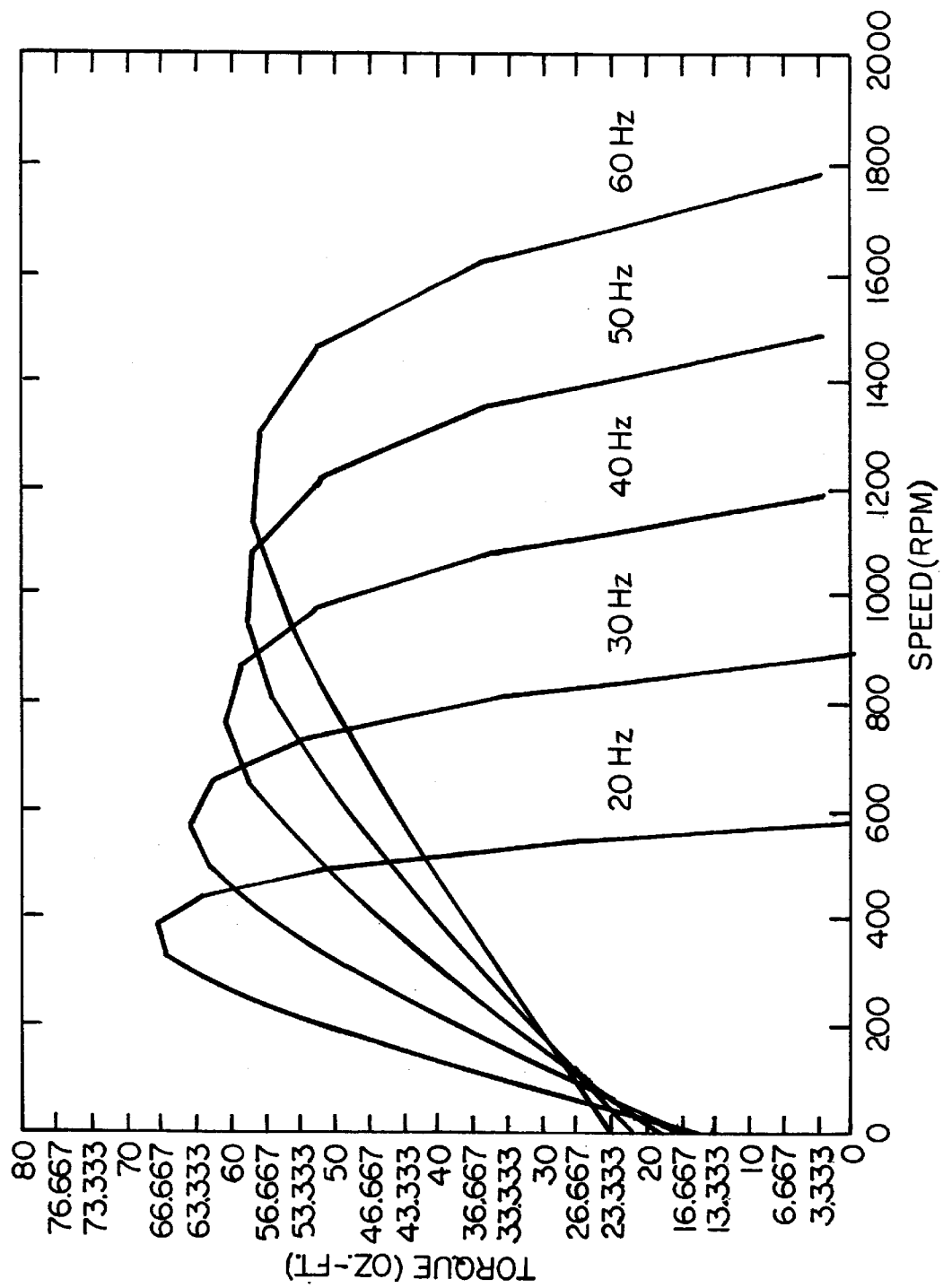
FIG. 8 illustrates torque versus speed curves for a SPIM operating at supply frequencies of 60 Hz and lower under a non-constant V/F control.

FIG. 8 illustrates torque versus speed curves for a SPIM operating at rated frequency and below under non-constant volts/frequency control. The rated frequency is 60 Hz.

In this case, the voltage is a function of the frequency as: $V_s=0.67f+80$, with voltage measured in Vrms and frequency measured in Hertz. In general, a function of the type: $V=K_1{}^*f+K_2$ has to be used in order to compensate for the reduction in the forward field when operating the SPIM at lower than rated speed. The constants $K_1$ and $K_2$ are values that depend on the motor design and performance requirement. For example, they may be adjusted (selected) in order to keep constant breakdown torque as a function of speed as shown in FIG. 8. Other criteria for adjusting (selecting) these constants may be the desire to keep a constant magnetization current or constant losses as a function of the applied frequency. Computer modeling and simulation can be used to derive these constants since a closed model may be difficult to analyze for a SPIM. In practice, these constants would be stored in a computer memory and the voltage equation just described would then be implemented as a function of the frequency.

The control of a voltage applied to a motor as a function of frequency normally is implemented using one of several known sinusoidal pulse width modulation techniques, e.g., as disclosed in the previously mentioned patents. However, in accordance with principles of the invention, for operation at lower than rated speed, a harmonic suppression technique with a square wave can be used instead of a PWM sinusoidal technique. This harmonic suppression technique allows for a simple voltage control without excessive overhead for the control electronics or microcomputer software and hardware.

The harmonic suppression technique takes into consideration that a given time based waveform can be controlled (i.e., reduced, or even eliminated) by introducing appropriate notches in the waveform. As described herein, a square wave (whether pure or notched) which is to be applied to a motor is always generated by a SPIM drive circuit described below. The motor current is a function of the motor impedance and internal voltages, as described above.

A square wave voltage waveform can be represented by an infinite series of frequency harmonics with known amptitude and phase:

$$V_m(t) = \frac{4}{\pi} V_{dr} \left( \sin\omega_e t + \frac{1}{3} \sin 3\omega_e t + \frac{1}{5} \sin 5\omega_e t + \dots \right)$$

Figure 9:
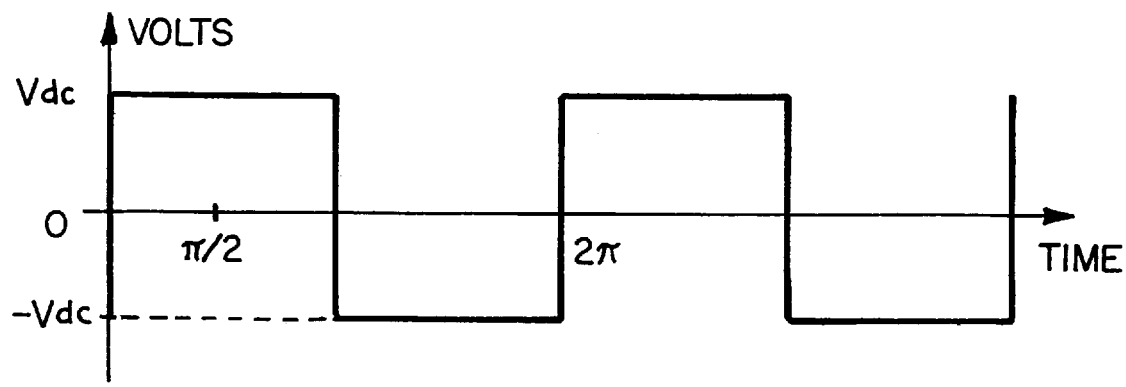
FIG. 9 illustrates a square wave signal useful for driving a SPIM in accordance with principles of the invention.

A square wave is illustrated in FIG. 9. Given a square wave with a voltage amplitude Vdc, as can be appreciated, the fundamental component will have an amplitude greater than Vdc (approximately 127% of Vdc) and the remaining harmonics will have varying lesser percentages as required to eventually add up and form the square wave.

Figure 10:
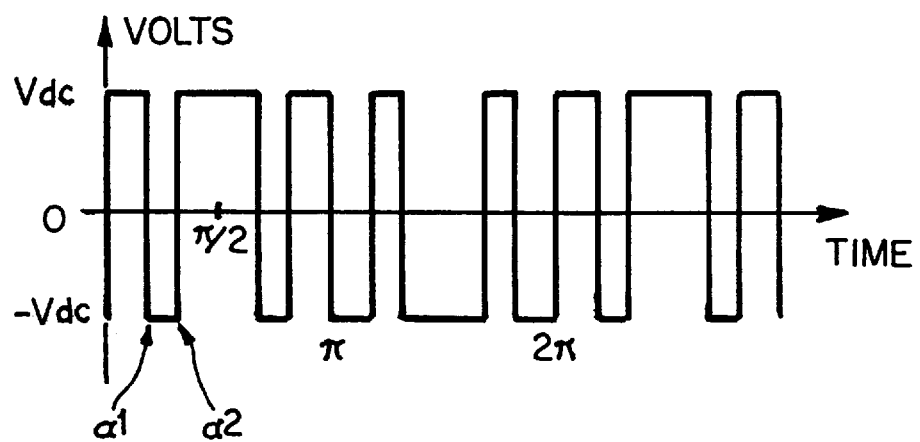
FIG. 10 illustrates a square wave signal with suppressed harmonics useful for driving a SPIM in accordance with principles of the invention.

When a notch with a width of $\alpha_2-\alpha_1$ is introduced in the square wave as shown in FIG. 10, the amplitude of all harmonic components will be altered as their energy is redistributed.

Note that quarter wave symmetry is preserved in the waveform. The new amplitude A(n) for the $n^{th}$ harmonic becomes:

$$A(n) = \frac{4}{\pi} Vdc \left[ \frac{1 - 2\cos(n\alpha_1) + 2\cos(n\alpha_2)}{n} \right]$$

With the introduction of one notch defined by two angles, one can control the amplitude of two harmonic components. As an example, the $3^{rd}$ and $5^{th}$ harmonics can be reduced by forcing the equation above to be zero for n=3 and 5. Hence, $A(3)=1-2 \cos (3\alpha_1)+2 \cos (3\alpha_2)=0$ $A(5)=1-2 \cos (5\alpha_1)+2 \cos (5\alpha_2)=0$ and the solution for this system of two equations is $\alpha_1=23.62°$, and $\alpha_1=33.30°$.

More notches can be introduced in the square wave in order to selectively eliminate higher order harmonics. This process allows the elimination of specific components that could otherwise excite the motor and/or appliance natural modes of vibration. It is important to realize that not all harmonics need to be reduced for a given application. For instance, if an application is sensitive to vibration or acoustic noise, the responsible harmonic only be reduced. Also, harmonics can be reduced in order to improve motor and power electronics performance. Instead of eliminating the $3^{rd}$ and $5^{th}$ harmonics, one could, for instance, reduce the fundamental and eliminate the $3^{rd}$ harmonic. In this case, the $5^{th}$ harmonic would not be reduced.

The just referenced suppression but not elimination of the fundamental frequency component comes into play particularly in schemes wherein voltage to frequency ratios are controlled at lower than rated frequency operation.

Figure 11:
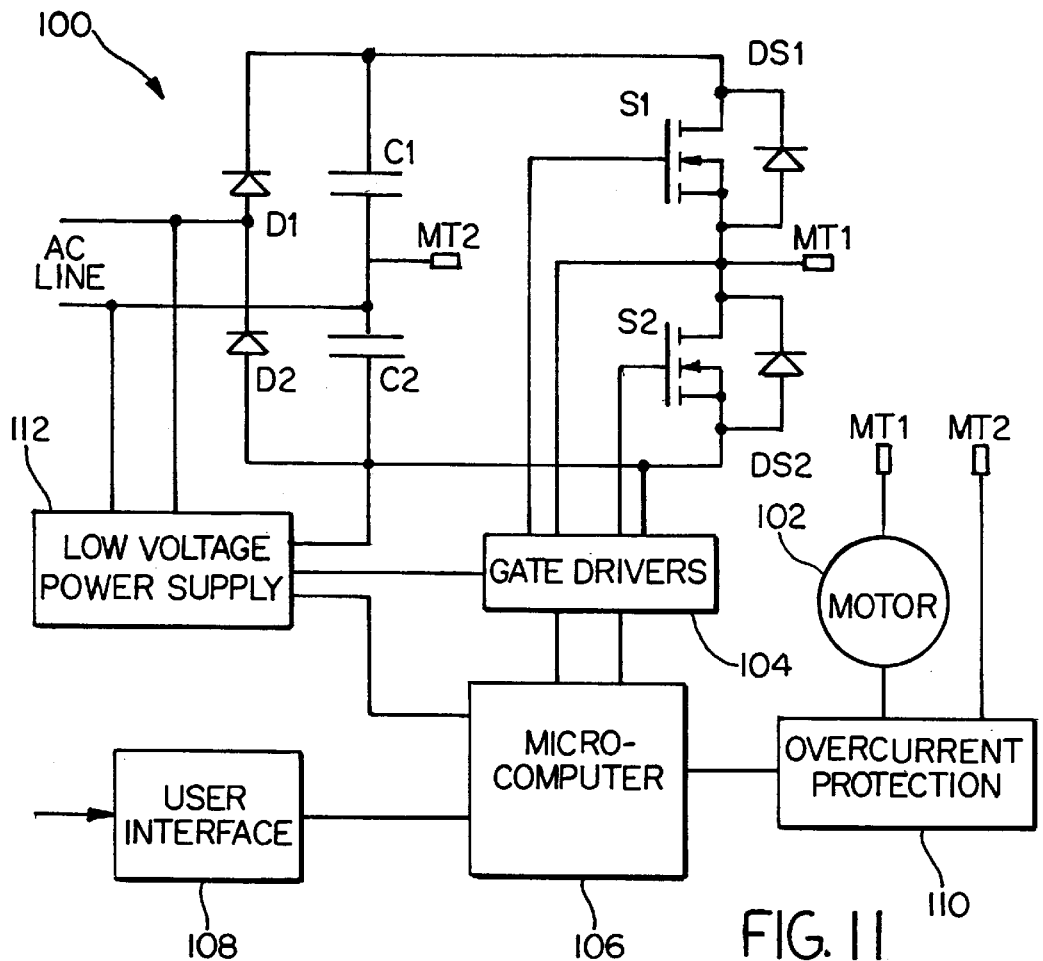
FIG. 11 illustrates a basic electronic circuit useful for driving/controlling a SPIM in accordance with principles of the invention.

FIG. 11 illustrates circuitry 100 to drive a SPIM 102. Power transistors S1 and S2 that control the motor current have their gates supplied by a gate driver circuit 104. This circuit operates as an interface between a low voltage microcomputer circuit 106 and the gates of the power transistors S1 and S2, by supplying the proper gating waveforms and doing the necessary voltage level shifting for the power transistors S1 and S2. The microcomputer 106 supplies the square wave or the harmonic suppression pattern to the gate drivers circuit 104. Two logic outputs of the microcomputer 106 are used, one for each gate of the power transistors S1 and S2. The microcomputer 106 executes software stored in its memory and the operating condition is determined by user interface circuitry 108. This interface 108 can be either analog (e.g., a potentiometer) or digital (e.g., key pad entry, rotary switch, etc.), and it commands the microcomputer software to generate the output pattern with desired frequency and voltage, by selecting a proper look up table stored in the microcomputer memory.

Protection against overcurrent is provided by an overcurrent protection circuitry 110 that interrupts the microcomputer 106 when the measured motor current becomes higher than a reference value. A low voltage supply 112 is used to supply appropriate power to all of these circuits.

Of course, those skilled in the art may consider using many different components to build a circuit such as the circuit 100. However, a Motorola microcomputer MC68HC705P9 has been successfully used as the microcomputer 106 and gate driver chip IR 2112 has been successfully used as the gates driver circuit 104.

FIGS. 12–15 show a simplified flow chart for the just referred to software for such a SPIM drive. The software represented by this flow chart is stored in the microcomputer memory, along with the voltage output waveform pattern that is supplied to the motor. The main objective for the control software is to generate the gate signals for the power transistors S1 and S2 according to a predetermined voltage pattern. The desired output pattern is discretized in small intervals and its value normalized to either one or zero. In this way, the pattern can be stored in the microcomputer memory.

Figure 16:
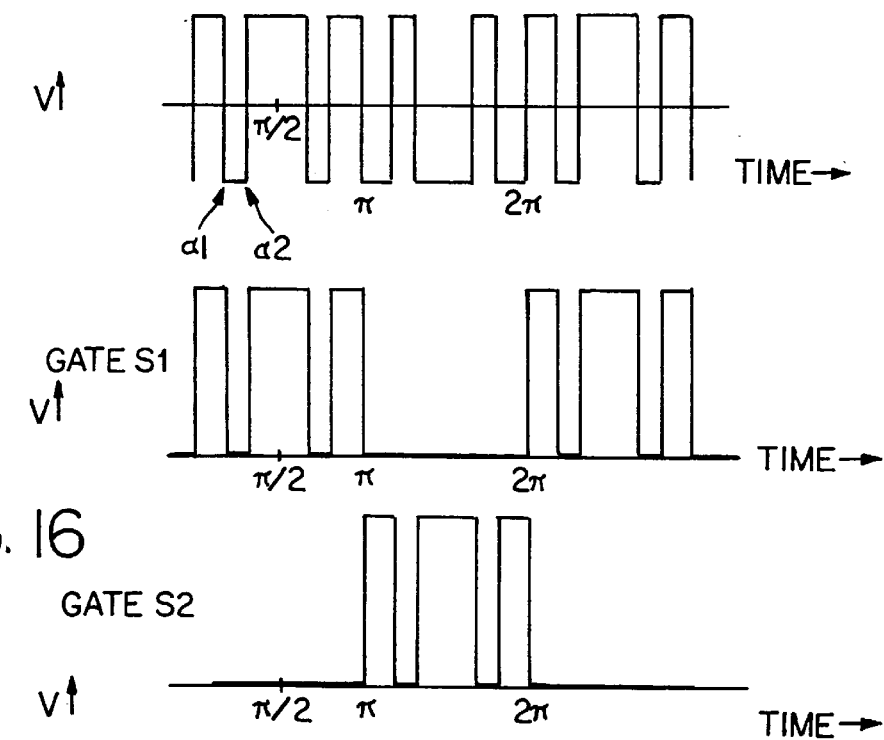
FIG. 16 illustrates a square wave signal with suppressed harmonics useful for driving a SPIM and gate logic signals for generating the square wave signal.
Figure 12:
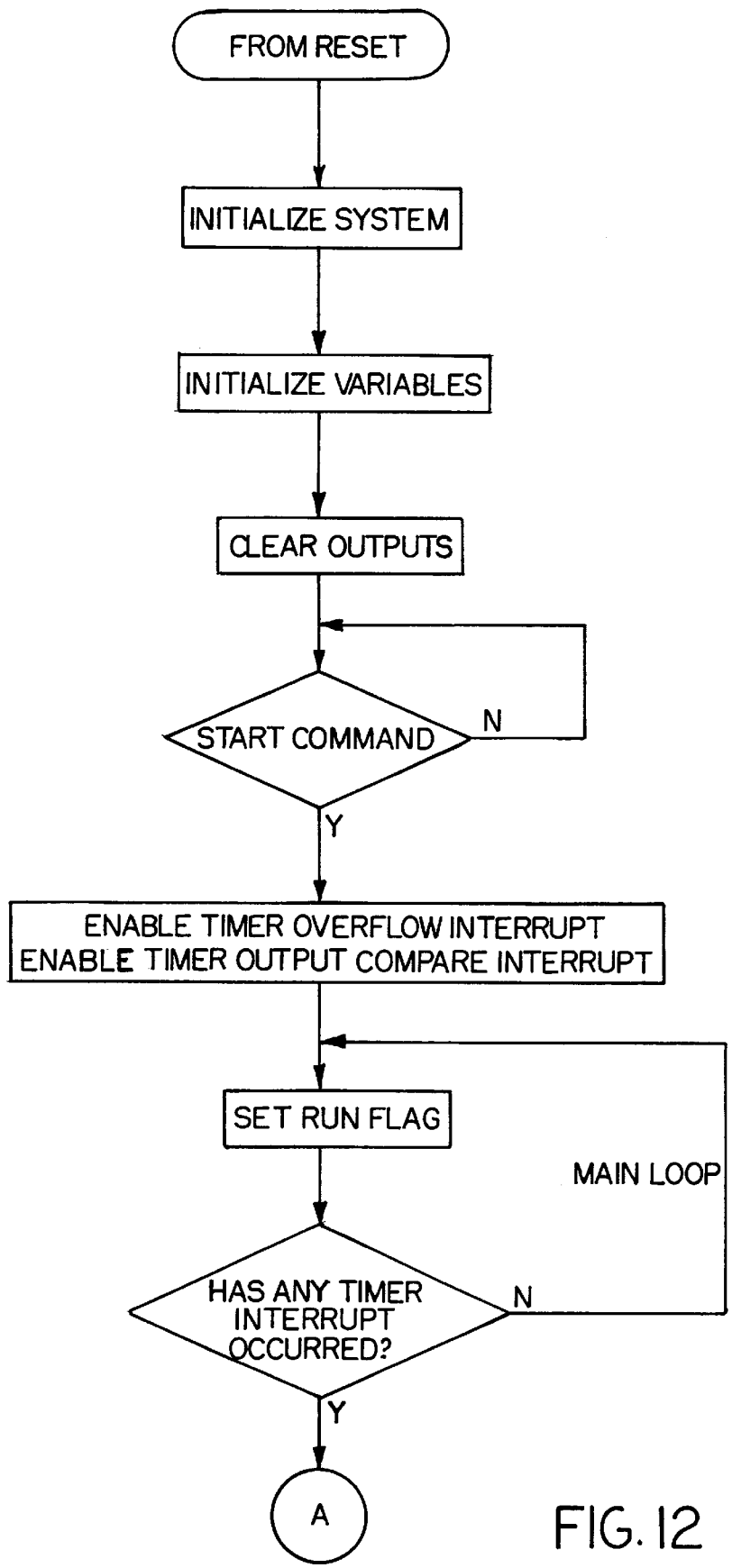
FIGS. 12–15 illustrate a flow chart of software for controlling a drive such as that illustrated in FIG. 11.
Figure 13:
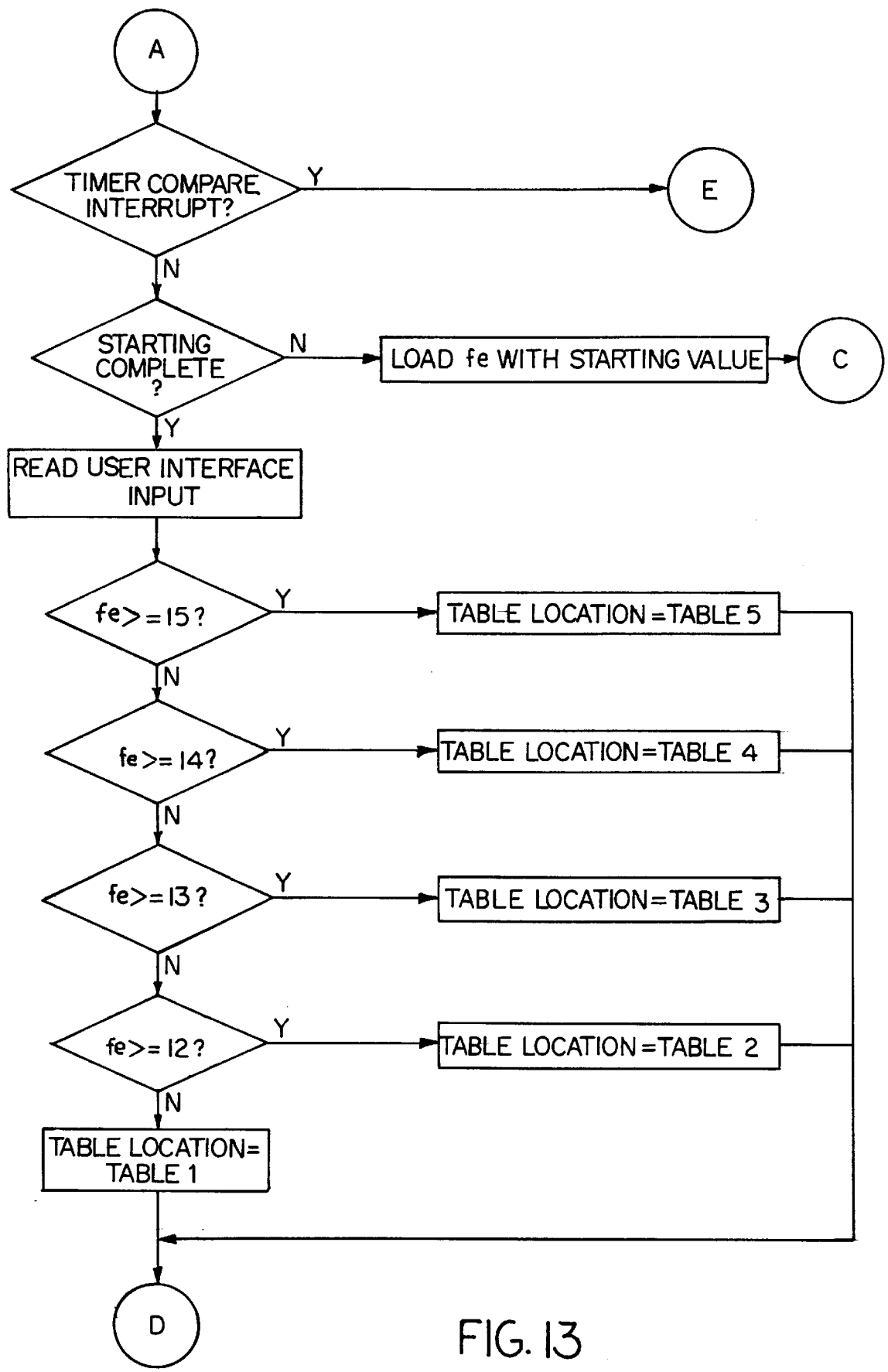
Figure 14:
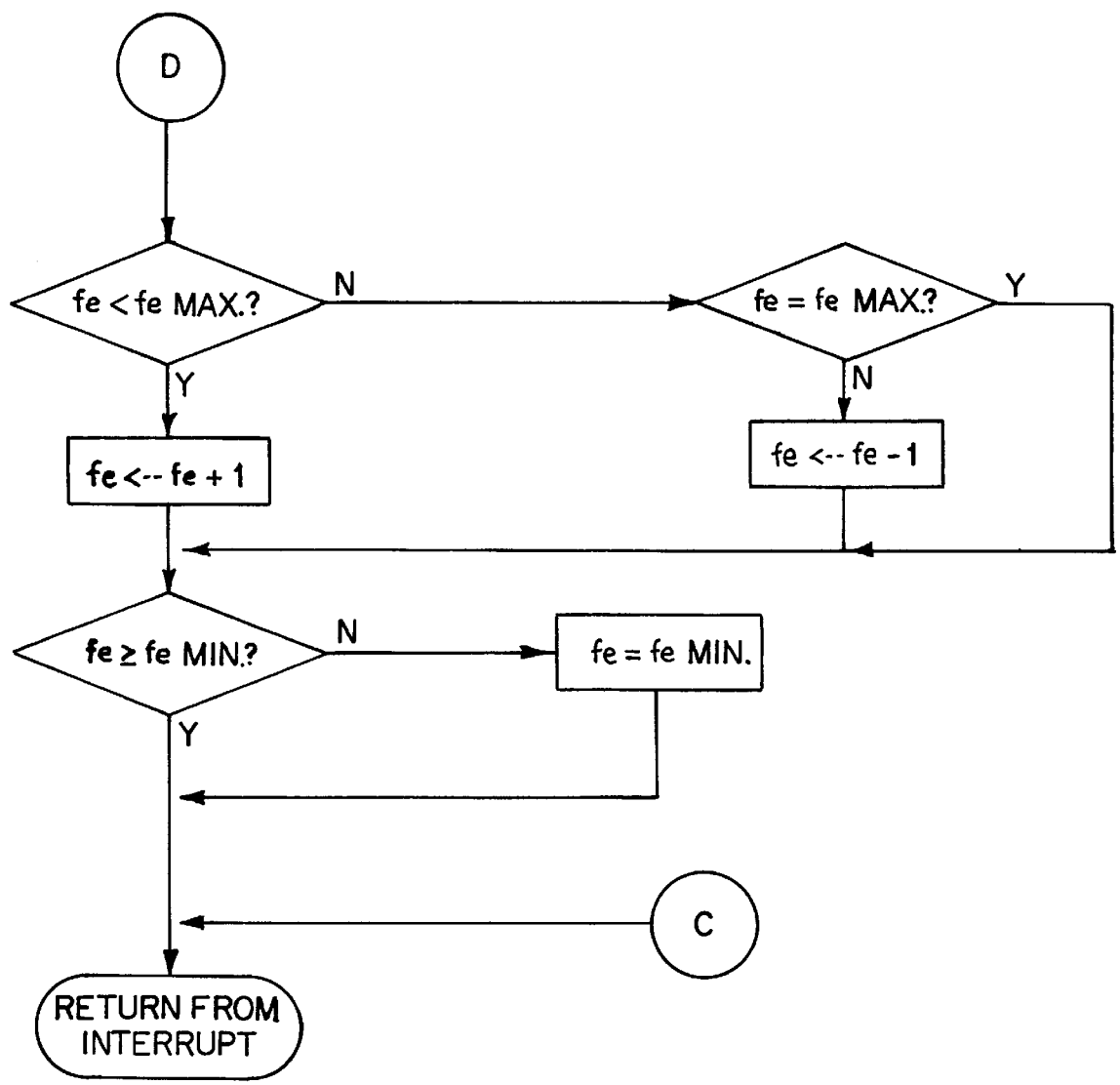
Figure 15:
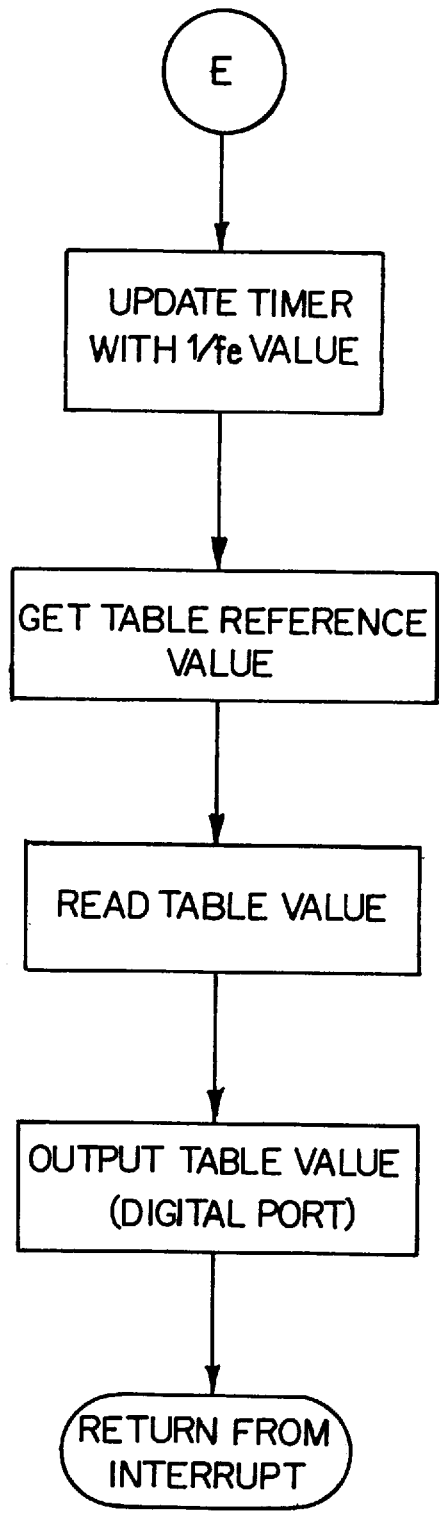

For instance, using the harmonic suppression pattern shown in FIG. 10, the necessary gate signals to generate such a pattern are depicted in FIG. 16.

The table stored in the microcomputer in this case can be defined according to the logic states of the gate signals, as:

| Gate S1 | Gate S2 |
|---------|---------|
| 1 | 0 |
| 0 | 0 |
| 1 | 0 |
| 0 | 0 |
| 1 | 0 |
| 0 | 1 |
| 0 | 0 |
| 0 | 1 |
| 0 | 0 |
| 0 | 1 |

Referring to the first part of the flow chart of FIGS. 12–15, when coming from a reset, the microcomputer starts to execute the software control by itializing the system and control variables to predetermined values. The microcomputer outputs are also cleared. Next, the software waits for a start command that comes from the user interface circuitry. The internal microcomputer timer generates interrupts (overflow and timer compare) that are the main control for the software. At point A in the flow chart, a check is made to verify if a timer compare or a timer overflow interrupt occurred. The software is designed so that the timer overflow interrupt occurs at a slower rate than the timer compare. Control is transferred to point E if timer compare interrupt is detected. If not, the user interface is read and a check is performed to verify if the system starting is complete. The user interface inputs the value of the desired voltage output frequency, fe, of the voltage pattern that is generated by the microcomputer and applied to the power transistor gates. A test is performed to verify in what band or range is the selected frequency value, fe, located. In this case, the flow chart shows that there are five bands defined by arbitrary frequency values f1 to f5. A proper table location that contains the output voltage pattern is selected according to the frequency range.

The flow starting at point D shows how the frequency value fe is bound to its maximum and minimum values. This is necessary in order to avoid motor operation at unwanted frequencies. The tables containing the output patterns are read in the section of the flow chart starting at point E. The timer compare register is loaded with the inverse of the frequency value fe, so that the rate of timer interrupts increase with frequency; consequently, the pattern table is read at a higher rate. The value read from the table is loaded into the microcomputer digital output that is wired to the gate drivers. The software then returns from the interrupt to the main loop.

Figure 17:
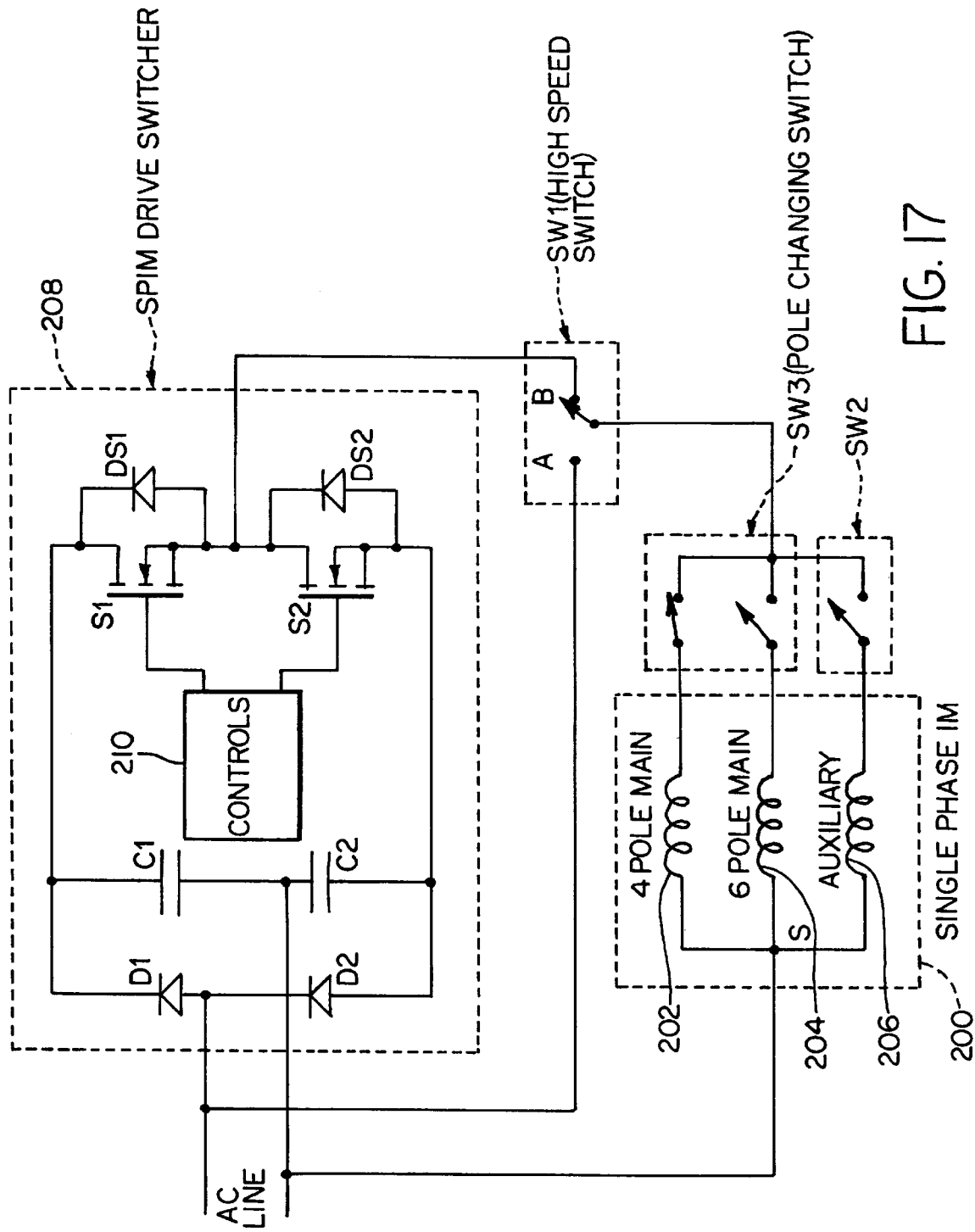
FIG. 17 illustrates a SPIM control circuit including higher than rated speed operation.

There are two terms used herein which are appropriately described at this point. The terms are: Full SPIM drive and reduced SPIM drive. The first term refers to a SPIM drive embodying principles of the invention set forth herein but wherein the SPIM is always connected to the SPIM drive, i.e., the motor is never driven by a direct connection to the AC power source. The second term refers to a configuration wherein the motor is selectively directly coupled either to an AC power source or to the SPIM drive. FIG. 11 illustrates a full SPIM drive configuration. FIG. 17, described next, illustrates a reduced SPIM configuration.

In FIG. 17, there is illustrated a single phase induction motor control scheme embodying principles of the invention. In FIG. 17, a SPIM 200 is represented. The motor 200 has a 4 pole main winding 202 and a 6 pole main winding 204 as well as an auxiliary winding 206. However, it is to be understood that the principles of the invention are applicable to any SPIM with any number and combination of poles.

As also illustrated, there is coupled between the motor 200 and a 60 Hz 120 V supply, what is referred to herein as an SPIM drive switcher 208. The SPIM Drive Switcher 208 is used to provide a power signal to the motor 200 in accordance with principles of the invention. For that purpose, the SPIM Drive switcher 208 includes power transistor S1 and S2, diodes DS1 and DS2 and capacitors C1 and C2 and diodes D1 and D2 appropriately coupled to provide a square wave output signal which is then applied to the motor 200. Switches SW1, SW2 and SW3 are appropriately coupled between the SPIM drive switcher 208 and the windings 202, 204 and 206, respectively, so that the output signal can be applied selectively to the windings. It can be appreciated that in the illustrated configuration, the auxiliary winding 206 is used for starting purposes only and is disconnected by the switch SW2, preferably a centrifugal switch, after the motor 200 reaches a critical speed. Again, the illustrated control scheme will operate with any other starting schemes using, for example, a starting or a starting/running capacitor arrangement. It should also be noted that any type of switch suitable to the circumstance can be used to accomplish the goals of the invention.

With reference again to the SPIM drive switcher 208, the input stage comprising the diodes D1 and D2 and capacitors C1 and C2 and forms a voltage doubler so that the effective voltage applied to the motor 200 by the SPIM drive switcher 208 is equivalent to that of the AC line supply voltage. In this way, a motor rated for an 120 V, 60 Hz (or 230 V, 50 Hz) AC line can be used with the SPIM drive switcher 208. The power transistors S1 and S2 are gated and turned on and off by a low voltage electronic circuit 210, as described above (which represents the gate drivers, microcomputers, etc.).

As further illustrated in FIG. 17, a common point of the motor stator winding s, is connected to one of the AC line inputs. The other stator winding side is connected via switch SW3 to the AC line by means of the switch SW1. In this case, the switch SW3 acts as a pole selection switch. When switch SW1 is in the illustrated A position, the motor 200 operates directly from the AC line, and for this particular case, two operating speeds are possible according to the pole switching switch SW3. When the switch SW1 is in the illustrated B position, the stator is connected to the electronic switching circuit 208 that supplies the motor 200 with a controlled square wave with a variable frequency and constant voltage.

In the illustrated control arrangement, the motor 200 starts and runs from a 60 Hz AC line supply. As an example, if the motor 200 were in a washer, then the motor would start up in a wash cycle. The switch SW1 is then switched to the B position when high speed operation is desired. Referring to the clothes washer example, this could occur during a high speed spin cycle. When that happens, the 4-pole winding 202 is supplied with a square wave of constant voltage but variable frequency. Therefore, in the illustrated control arrangement, the motor 200 operates from the 60 Hz AC line for most of the wash and spin cycles. Only during the short portion of the spin cycle where high speed spin is desired, is the switch SW1 switched to connect the motor 200 to the SPIM drive switcher circuit 208. Of course, the switch SW3 also provides for selection of the 4 or 6 pole winding for 2 speed operation.

Figure 18:
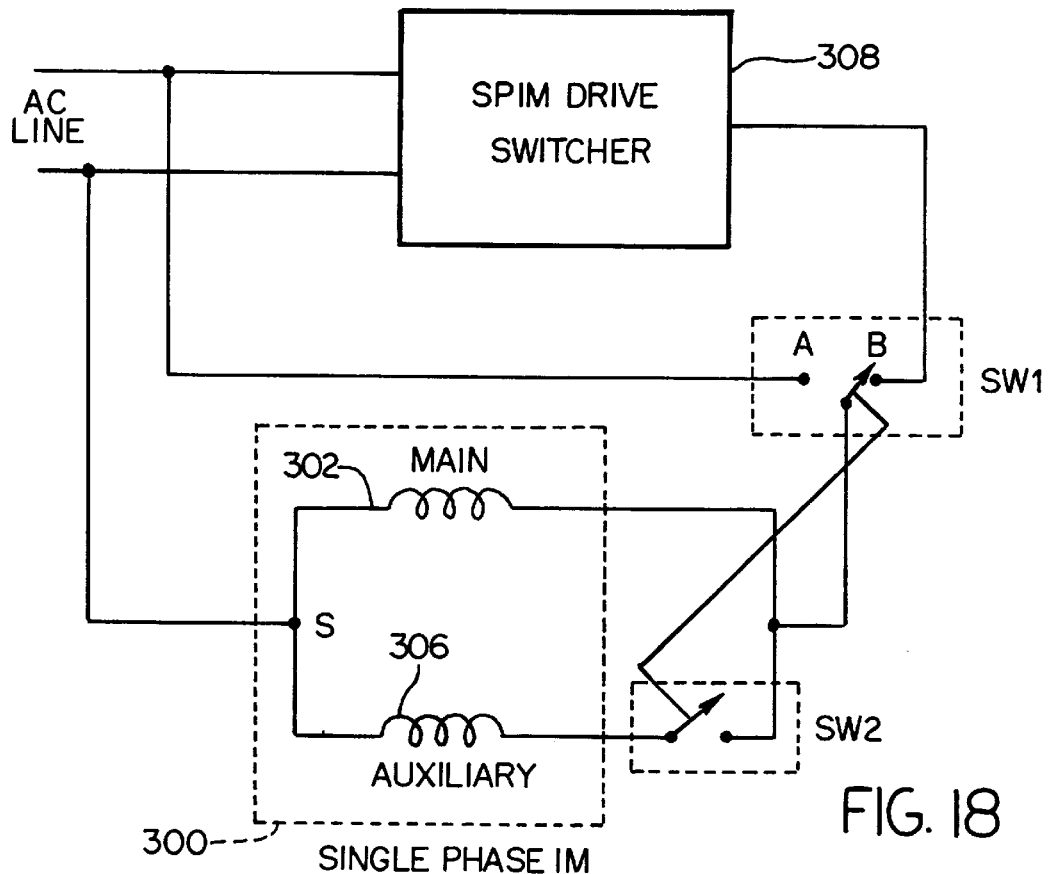
FIG. 18 illustrates a SPIM control circuit including AC line starting and full variable speed operation.

In FIG. 18 there is illustrated another reduced SPIM drive control scheme embodying principles of the invention. As illustrated, the principal difference between the control scheme of FIG. 18 and the control scheme of FIG. 17 is that the motor 300 of FIG. 18 is supplied from the AC line only during starting. After the motor 300 reaches a certain speed, the switch SW2 opens and the switch SW1 connects the stator to the SPIM drive switcher circuit 308, which is substantially identical to SPIM drive switcher 208. The voltage supplied to the motor 300 has variable frequency and variable fundamental voltage amplitude, so that the motor 300 can run at different speeds. A harmonic suppression scheme is then employed to control the power signal applied to the motor 300. In that regard, a sine modulation can be used to reduce current harmonics, and therefore, the total current requirement of the SPIM drive switcher 308. It should be noted that a two speed motor is not necessary in the FIG. 18 control scheme, since the motor 300 is capable of variable speed operation. For high speed operation, the motor 300 is driven with a square wave of constant amplitude but variable frequency, just like the scheme described in connection with FIG. 17.

Figure 19:
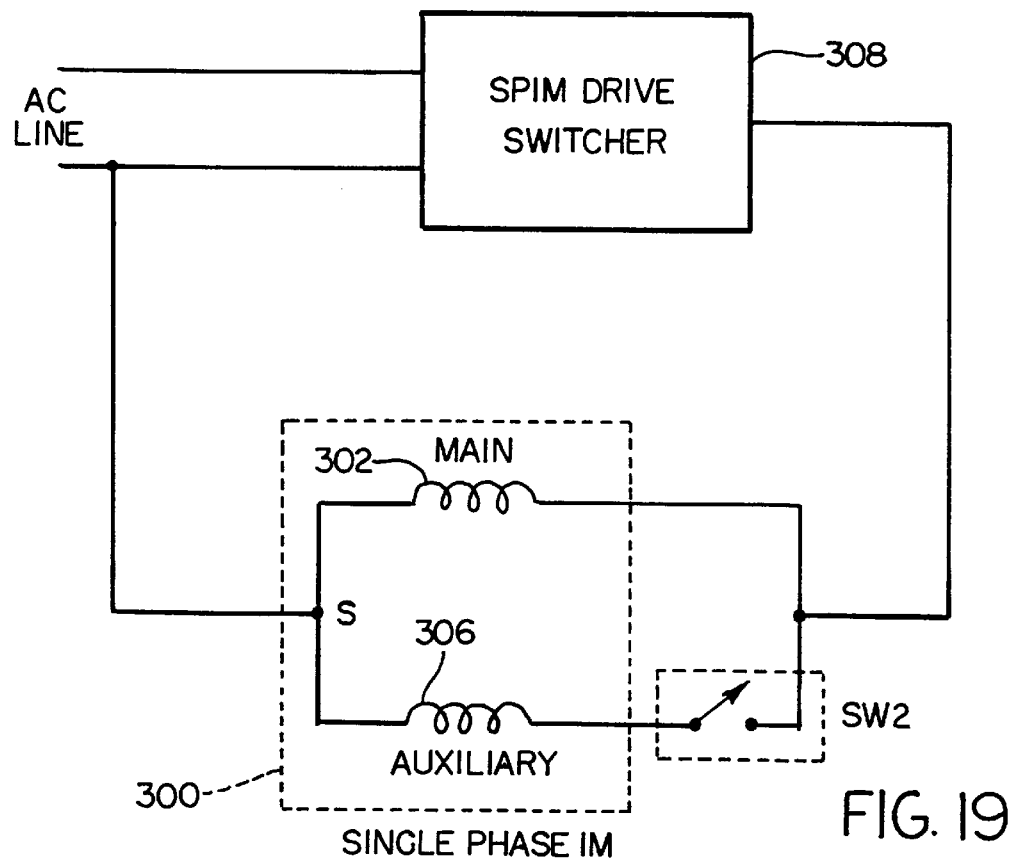
FIG. 19 illustrates a SPIM control circuit including electronically controlled starting and full variable speed operation.

In FIG. 19 there is illustrated a variation of the control scheme of FIG. 18. In FIG. 19, the switch SW1 has been eliminated. In this case the motor 300 is completely controlled by the SPIM drive switcher 308, even during starting. A PWM control scheme has to be used for variable speed running and a non-modulated square wave is supplied when the motor is to be operated at high speed.

It can be appreciated that the control scheme of FIG. 17 is elegant in its simplicity and therefore very advantageous. The electronic control circuitry is simple since no PWM is required. The system also has no inrush current through the SPIM drive switcher during starting, thereby reducing the current requirement (and cost) of the power transistor devices. Also, the SPIM drive switcher 208 operates during short cycles, which can translate into better thermal management and improved reliability, particularly given cycling appliances such as clothes and dish washers. Of course, one disadvantage of the illustrated control scheme is that different speeds can be achieved by stator winding pole changing only.

In contrast, the control schemes of FIGS. 18 and 19 provide for variable speed operation while simplifying the motor stator winding arrangement. Only one winding is necessary as compared to the two or more needed in the arrangement of FIG. 17.

With reference to the scheme of FIG. 18, the starting current is not supplied by the SPIM drive switcher 308, and that helps to reduce the current requirement for the power transistors, which in turn means the power transistor can be of a lower power and cost. Of course, the scheme of FIG. 18 requires a more complex control for the generation of the harmonic suppression.

Figure 20:
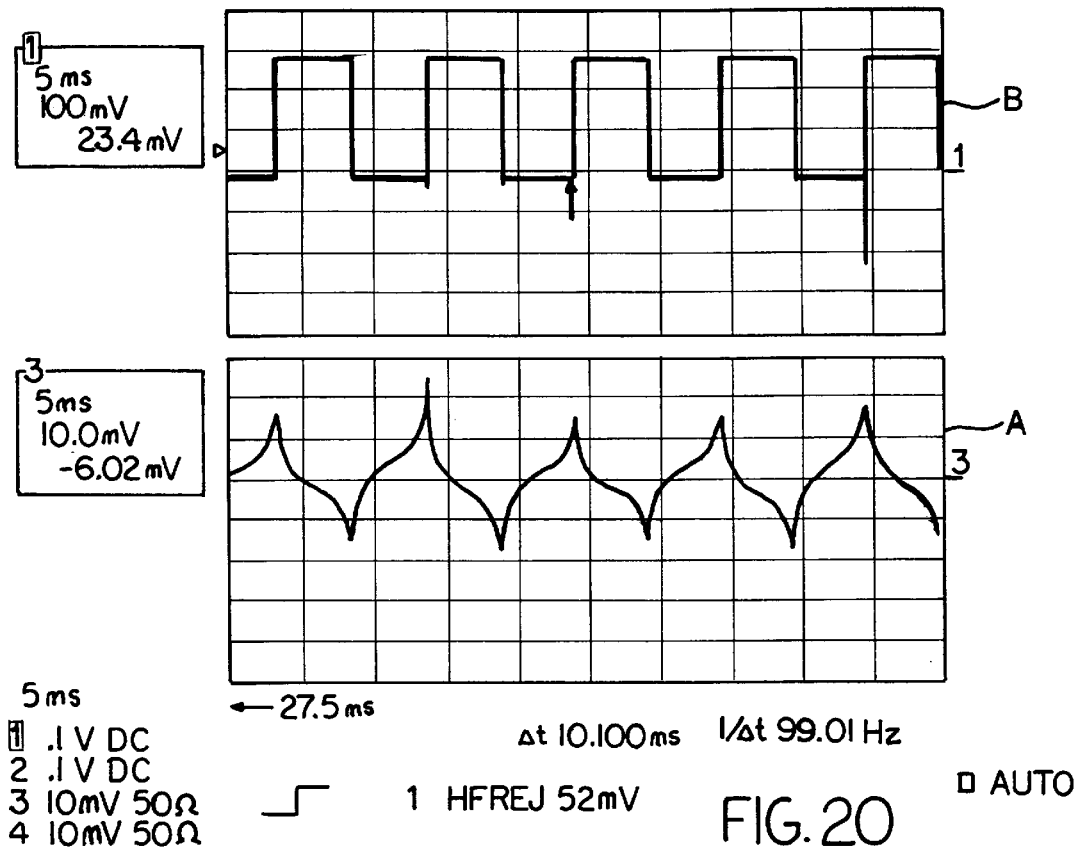
FIG. 20 illustrates a plot of a SPIM phase current during steady state operation at 3,000 rpm.
Figure 21:
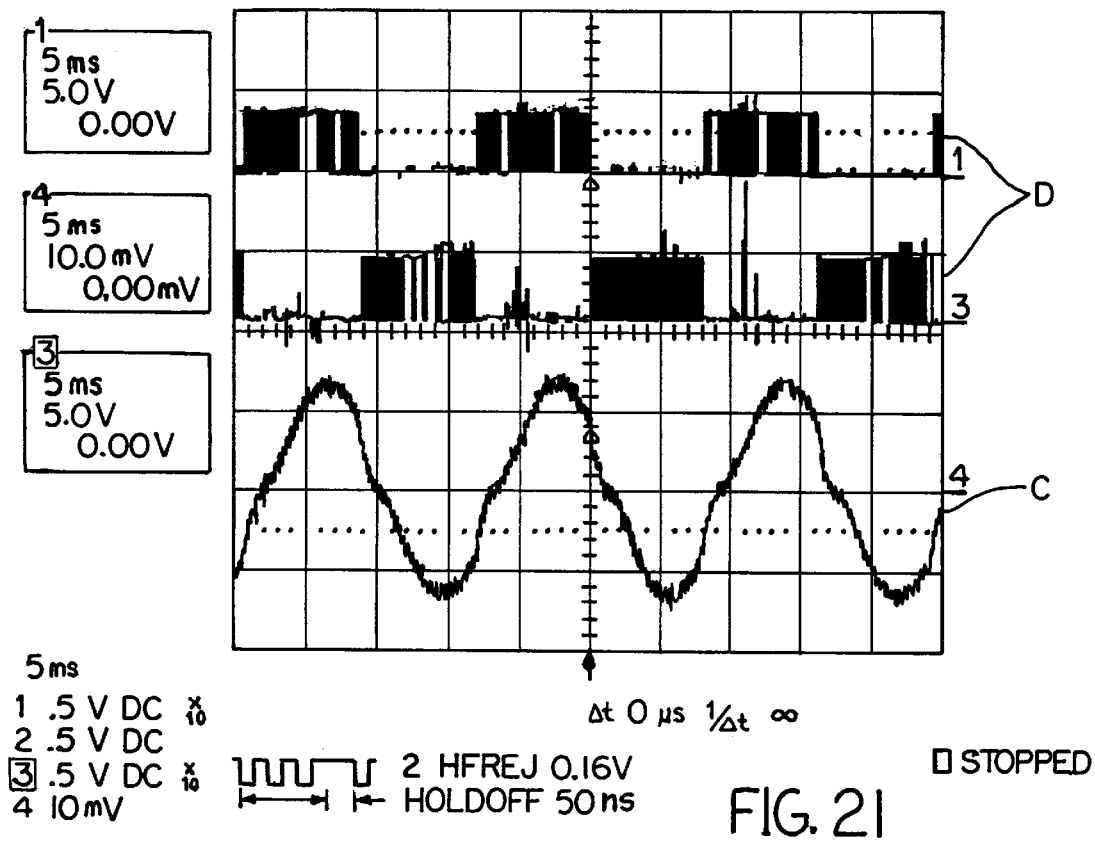
FIG. 21 illustrates a plot of a SPIM phase current during steady state operation at 1,800 rpm.
Figure 22:
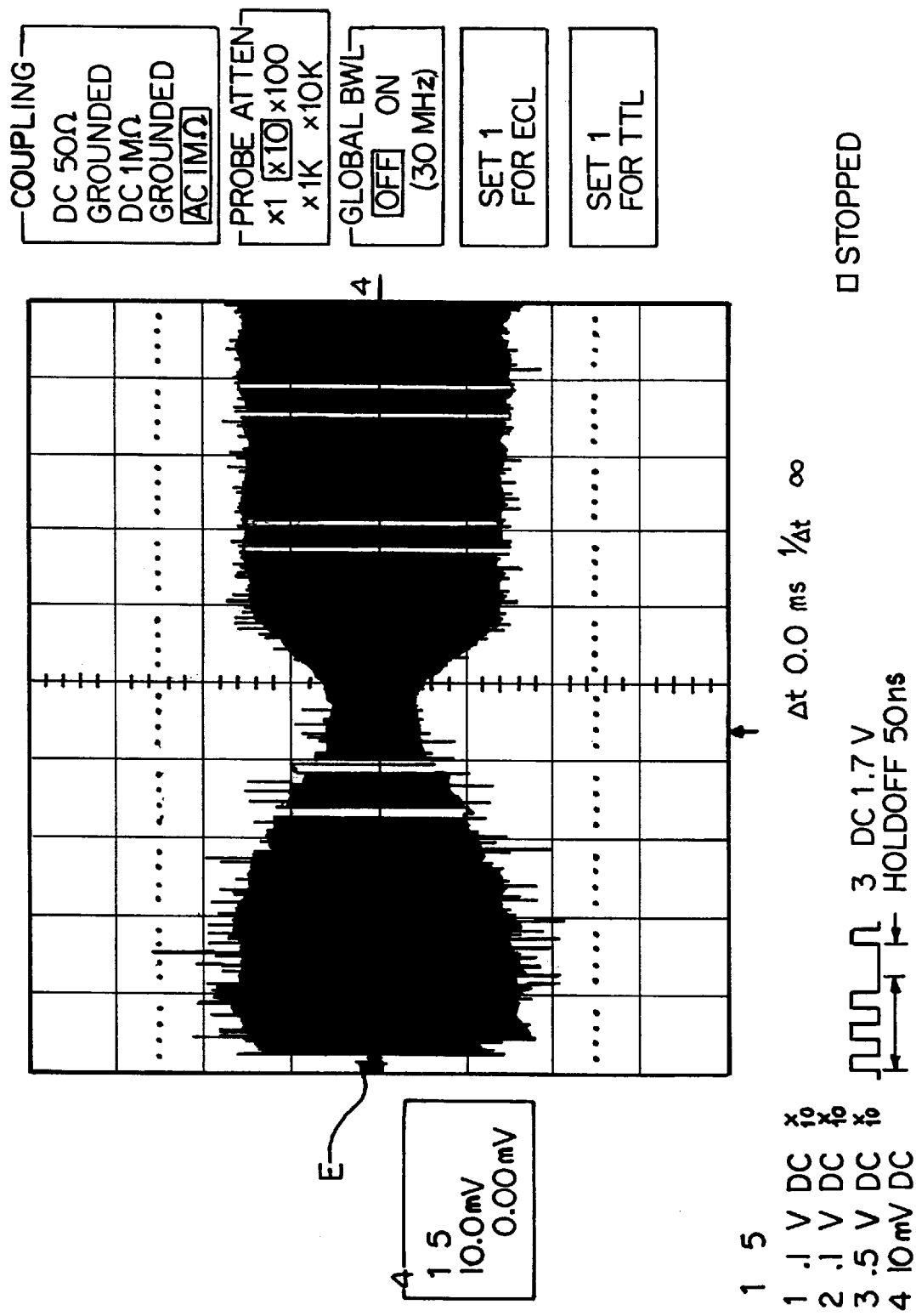
FIG. 22 illustrates a plot of a SPIM phase current during starting transient.

FIGS. 20–22 illustrate experimental results obtained from implementation the systems just described. The motor main winding current during steady state operation for the system of FIG. 17 is illustrated in FIG. 20 as curve or trace A. The motor was considered unloaded and running at approximately 3,000 rpm with the 4-pole winding 202 selected. The gate signal applied to one of the power transistors of the SPIN drive switcher 208 is illustrated as curve or trace B.

In FIG. 21 there is illustrated a curve or trace C for the motor winding current during steady state operation at a relatively lower speed of 1,800 rpm. Also illustrated is a curve or trace D for the gate signals applied to the power transistors by the control circuit of the SPIM drive switcher circuit.

In FIG. 22 there is illustrated a trace or curve E for the motor starting current for the control scheme of FIG. 19. Sine-selective harmonic suppression is used to control the voltage applied to the motor in accordance with principles of the invention.

FIGS. 23–27 illustrate further reduced SPIM drive control schemes.

Figure 23:
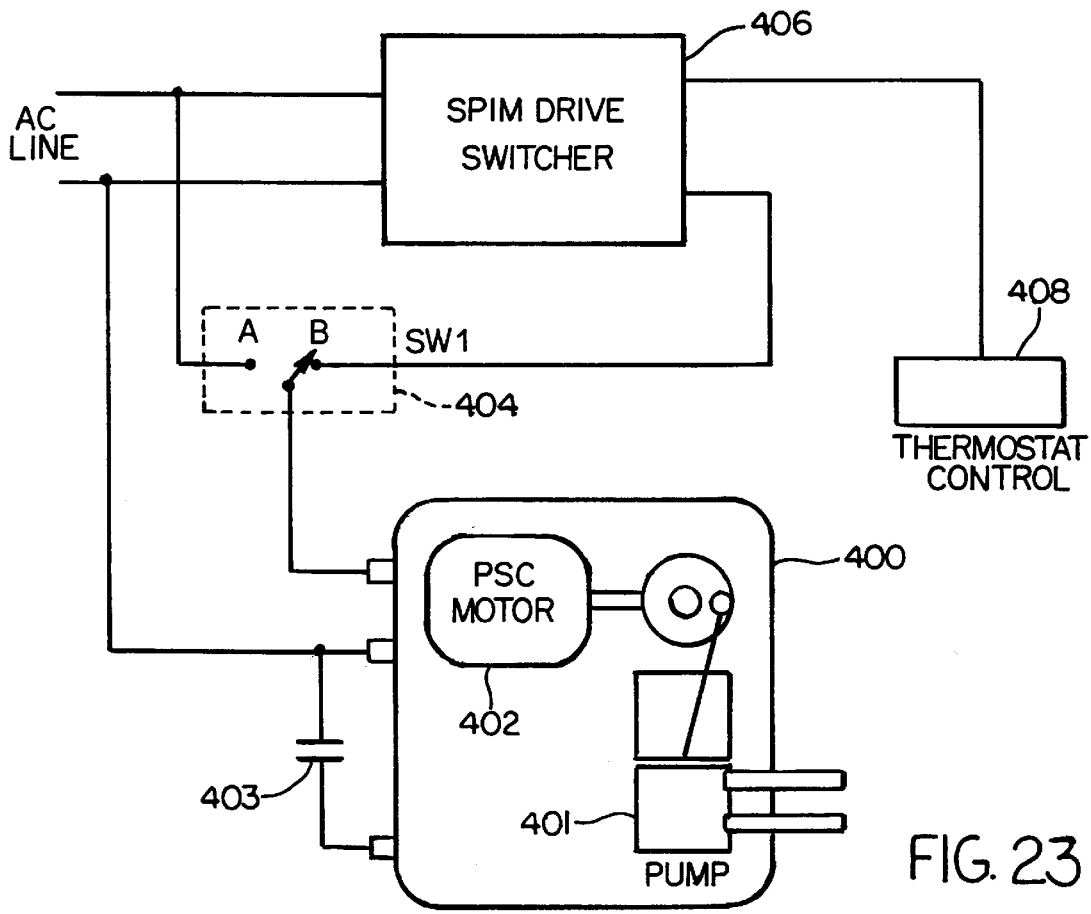
FIG. 23 illustrates a SPIM control circuit employed for driving a PSC SPIM for a hermetic compressor in a refrigeration system.

FIG. 23 shows a hermetic compressor 400 whose pump 401 is driven by a PSC single phase induction motor 402 that is connected to its running capacitor 403 and the AC line. The PSC motor 402 is directly connected to the AC line when the selection switch SW1 404 is in position A. In that case, the motor 402 runs on a single speed from the sinusoidal AC line supply what guarantees the maximum motor efficiency. A two or a four pole PSC motor can be designed for operation in this case depending on the desired compressor operating capacity and displacement. The thermodynamic system is designed so that the compressor operates most of the time driven directly from the AC line for maximum system efficiency.

When compressor operation at high speed is desirable for pull down or fast cooling, the selection switch 404 is moved from position A to position B. In this case, the SPIM drive control 406 supplies power to the motor 402 at variable frequency and voltage, as necessary and as desirable in accordance with the principles discussed herein. The selection switch 404 is moved back to position A when compressor operation at low speed is selected by thermostat controller 408. Hence, the power supplied to the compressor 400 can be alternatively switched between the AC line and the output of SPIM drive 406 as required by the product thermostat control, allowing maximum system efficiency and high capacity when the compressor 400 operates from the AC line or from the SPIM drive 406, respectively.

There are several other schemes for connecting the motor windings to the SPIM drive 406 and to the external motor capacitor depending on the frequency and speed range of operation. These are described next.

Figure 24:
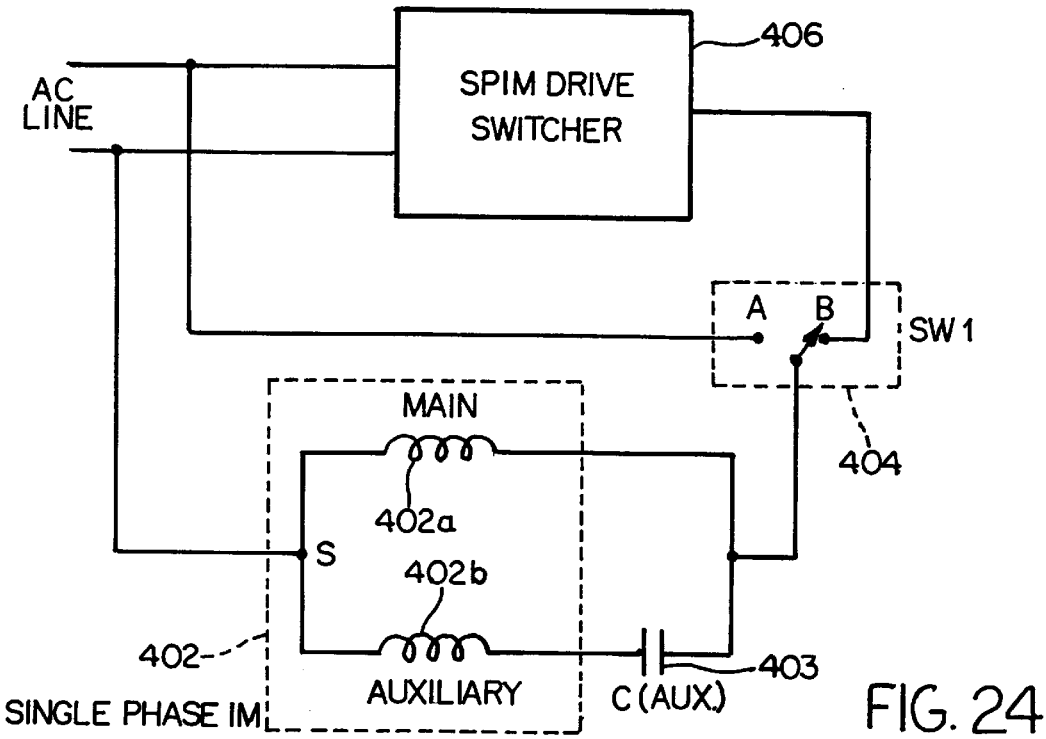
FIG. 24 illustrates another circuit for driving a PSC SPIM with PSC operation with s rated capacitor at high frequency.

The compressor motor 402 can operate in a regular PSC mode with its rated capacitor value when supplied by the AC line, as shown in FIG. 24. A switch SW1 is used to connect the motor windings to the SPIM drive output when high frequency operation is desired. Operation in this mode requires a proper SPIM drive output voltage and frequency control in order to avoid the effects of the decreasing capacitor reactance with increased frequency. In such case, a voltage control scheme would be appropriate.

Figure 25:
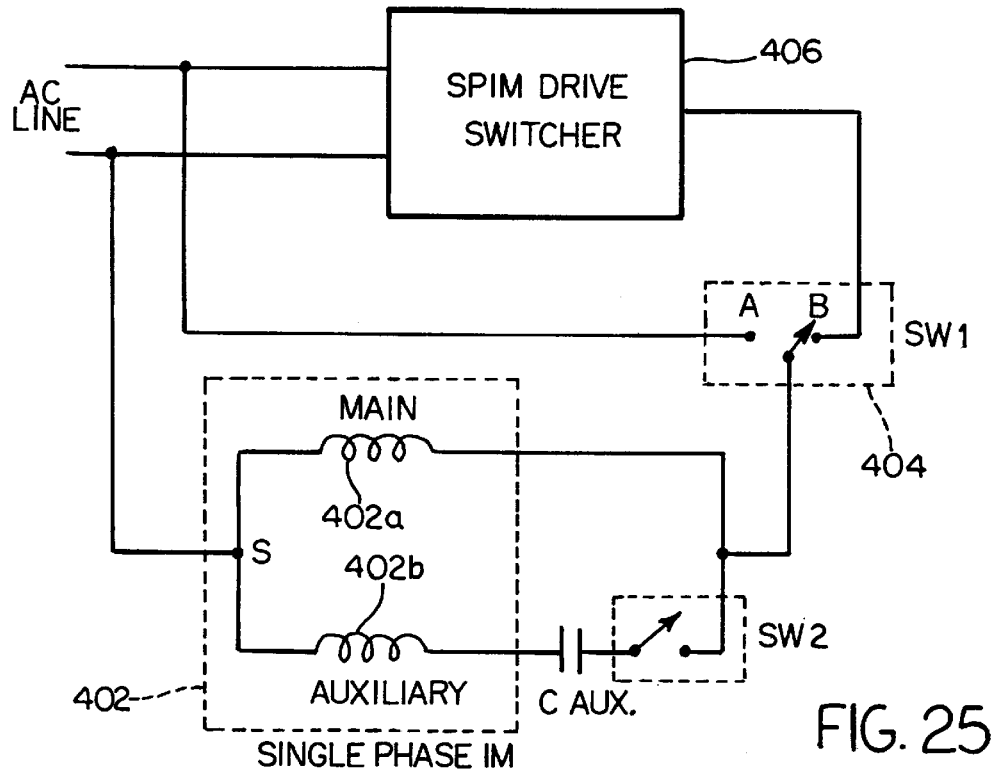
FIG. 25 illustrates yet another circuit for driving a PSC SPIM with split phase operation at high frequency.

FIG. 25 shows another connecting scheme for the SPIM drive 406 and the PSC motor 402. A second switch, SW2, is used to open the PSC motor auxiliary winding 402b when operating in high frequency. In this way, the motor 402 operates as a split phase induction motor for high frequencies. Proper control of SPIM drive output voltage and frequency is necessary to guarantee operation at high speed within the limits of the motor breakdown torque.

Figure 26:
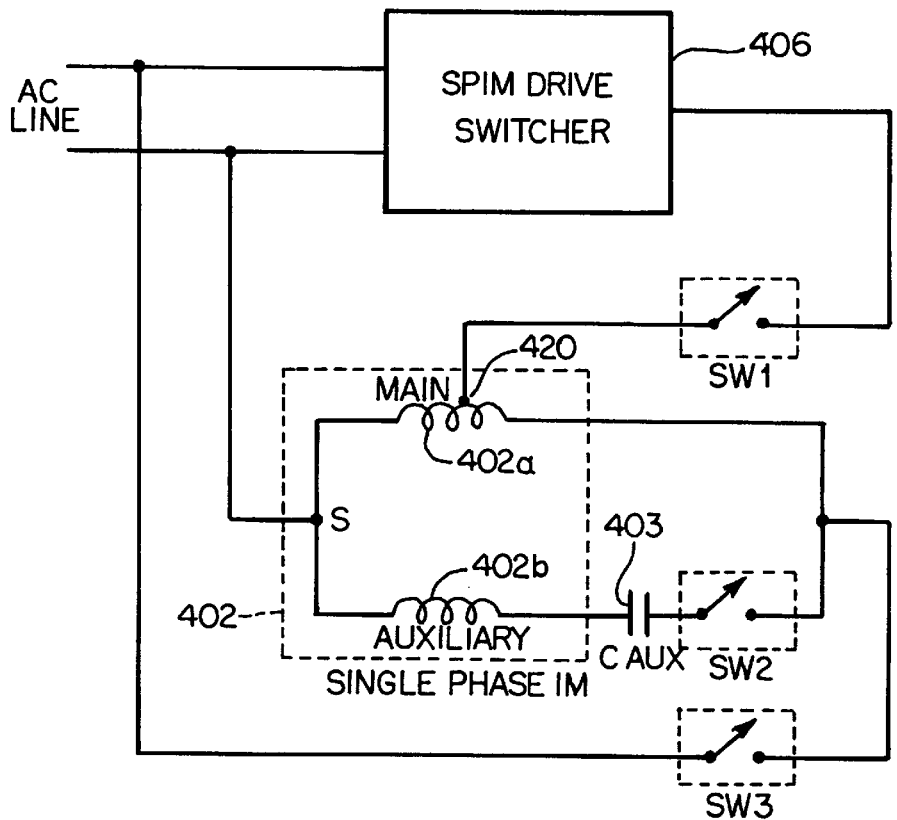
FIG. 26 illustrates a further circuit for driving a PSC SPIM with tapped winding operation at high frequency.

Wider speed range is achieved with the scheme shown in FIG. 26. It is very similar to the scheme discussed in FIG. 25, except another switch SW3 is introduced. The switch SWI is used to connect the SPIM drive switcher 406 to a tap 420 in the main winding 402a for high frequency operation. The motor 402 operates as a PSC motor at rated speed and frequency, directly connected to the AC line, when SW2 and SW3 are closed, and SWI is opened. Switch SW1 is closed and SW2 and SW3 opened when high frequency (high speed) operation is commanded from the SPIM drive controls.

Figure 27:
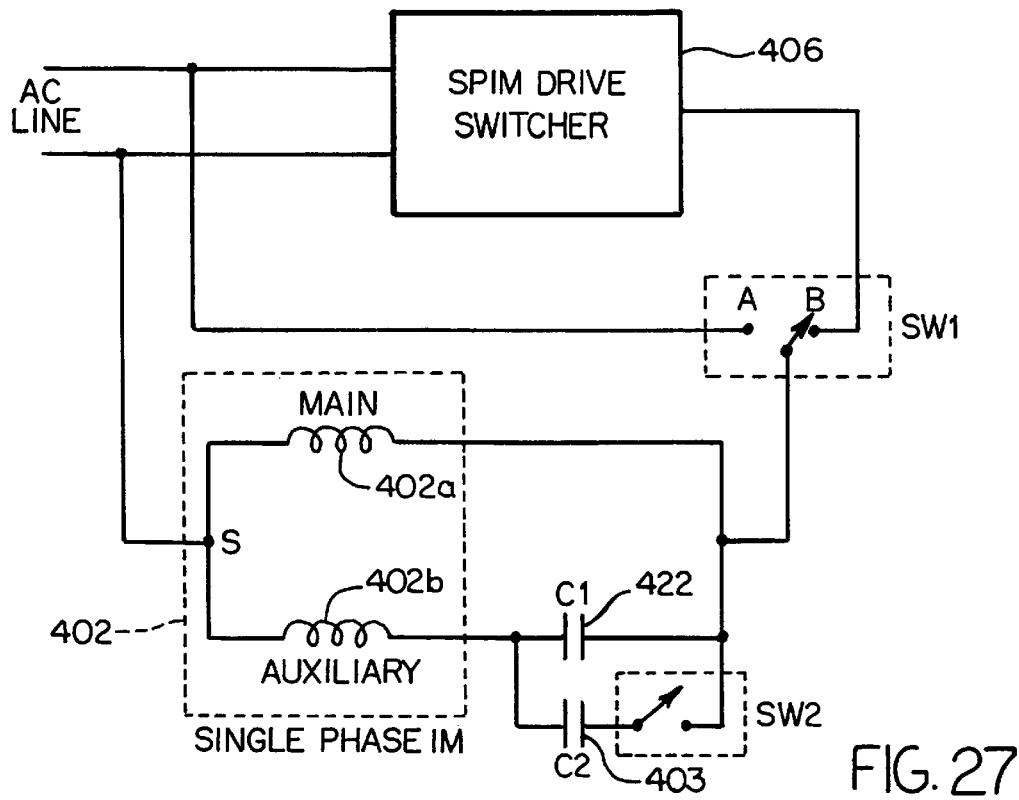
FIG. 27 illustrates yet a further circuit for driving a PSC SPIM with PSC operation with extra capacitor for high frequency.

The scheme shown in FIG. 27 also is similar to the one described in FIG. 25, except one more capacitor 422 is added in the auxiliary winding circuit in parallel to capacitor 403 and switch SW2. The two capacitors are connected in parallel when the switch SW2 is closed, with an equivalent capacitance given by the sum of the two, i.e., Cequivalent= C1+C2, wherein C1 is the capacitance of capacitor 422 and C2 is the capacitance of the capacitor 403. Thus, the motor operates as a PSC motor with SW2 closed and SW1 connected to the AC line. The values for capacitors 403 and 422 are such that the equivalent capacitance is the rated value for the PSC motor 402. When operation at high frequency is desired, the switch SW1 connects the SPIM drive 406 to the motor 402, and SW2 opens, leaving only the capacitor 422 in the auxiliary winding circuit. A proper value for capacitor 422 is selected so that the motor 402 operates as a PSC motor with designed performance at high frequencies. The widest speed range with highest motor performance is achieved with this connection scheme.

Figure 28:
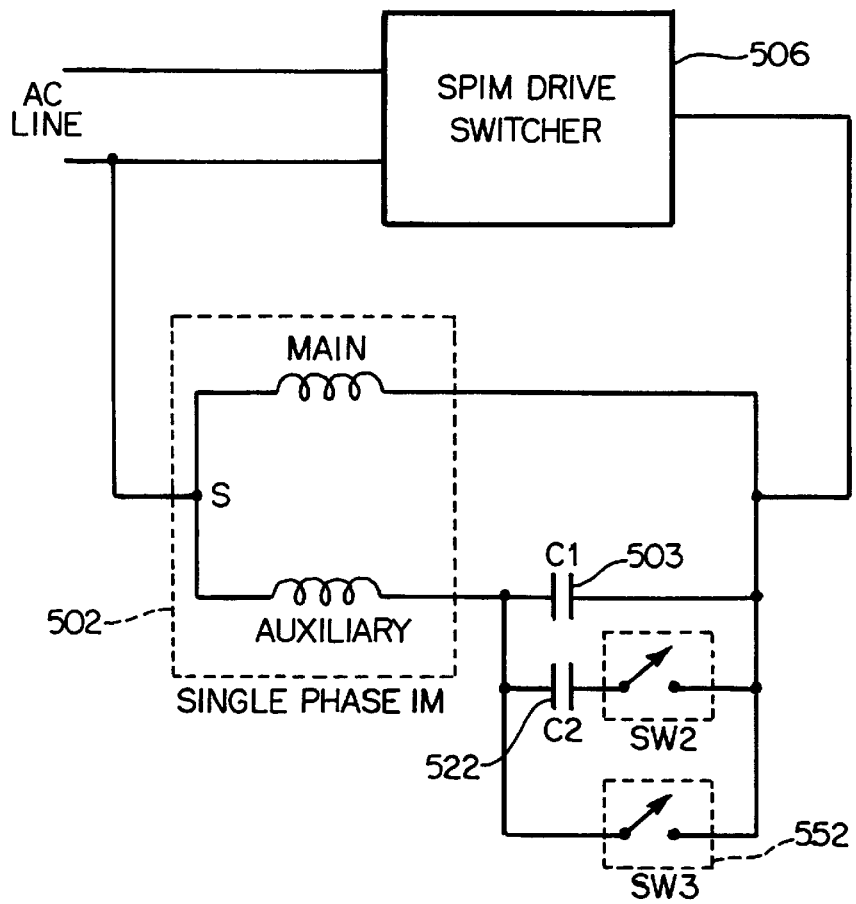
FIG. 28 illustrates another circuit for driving a PSC SPIM with motor permanently connected to SPIM drive.

The scheme shown in FIG. 28 permanently connects a SPIM drive 506 to a PSC motor 502, eliminating the need for switch SW1 in FIG. 27. This is a full SPIM drive configuration. Alternatives include a starting switch SW3 552 that can be used to increase the starting torque by starting the motor using a high resistance auxiliary winding. After starting, the switch SW3 is opened and the motor operates as a PSC motor with a capacitor with a total capacitance given by the sum C1+C2. The switch SW2 is opened when operation at high speeds is desired. When SW2 is opened, the total motor capacitance reduces to C1 and higher frequency can be applied to the motor by the SPIM Driver switcher.

In summary, as noted for the schemes shown in FIGS. 27 and 28, it is important to reduce the motor capacitor size in order to keep motor performance at high frequency operation. The proper capacitor size is define by either motor design, system simulation, or experimentation. More than two capacitors may be connected in parallel in order to operate the motor at very high frequencies, or speeds (four to six times the rated frequency).

Recapping, the present invention provides means and method for operating single phase induction motors at other than rated speed. For high frequency operation, i.e., at higher than rated speed, there are three different schemes that can be used. In the first scheme, a square wave can be applied without any modulation directly to the SPIM to be driven. This (a) provides a higher voltage than the fundamental frequency (approximately 27% greater voltage), (b) provides a higher breakdown torque than the fundamental, and (c) it provides for a wider speed range than would sinusoidal PWM modulation. Second, a selective harmonic suppression or elimination scheme can be used. Such a scheme would be used to reduce/eliminate unwanted harmonics thereby to reduce acoustic noise or losses. This scheme can provide for a lower cost implementation than sinusoidal PWM techniques. Additionally, this scheme provides for a higher torque because of the increase in the amplitude of the fundamental frequency. Third, the motor can be configured with either of these schemes for different operations. In that regard, the motor can be provided with multiple capacitors for different operating conditions, or the windings can be tapped as set forth above. Lastly, any combination of the foregoing can be provided.

For low frequency operation, i.e., at speeds lower than rated, there are again several different schemes that can be used. A first scheme can be the selective harmonic suppression or elimination scheme. Second, the amplitude of the first harmonic can be controlled to provide increased torque at lower speeds. Third, the voltage to frequency ratio can be controlled to provide the desired effect, as set forth above. Finally, the motor can be configured, i.e., selected to provide the best operation given in the use of any of the schemes just mentioned, i.e., the selection of a permanent split capacitor motor, a split phase motor or a split phase with tapped windings.

Although modifications and changes may be suggested by those skilled in the art, it is the intention of the inventors to embody within the patent warranted hereon all changes and modifications as reasonably and properly come within the scope of their contribution to the art. Further, while the invention has been described in connection with washers and refrigeration systems, the invention is applicable to all products where variable speed would be used, either to save energy, improve the product operation performance, or to add product differentiating features. Such other products include, vertical axis washers, horizontal axis washers, air conditioners, et cetera.

I claim:

1. A motor controller for a single phase induction motor having at least one winding, comprising:

means for generating a square wave power signal; and means for controlling the shape of the square wave power signal and applying the shape controlled square wave power signal to the at least one winding of the motor, the controlling means further includes means for suppressing selected frequency components of the square wave.

2. A method for controlling a single phase induction motor comprising the steps of:

a) connecting the motor to a motor drive;

b) generating a square wave drive signal with the motor drive;

c) suppressing one or more harmonics in the square wave motor drive signal by controlling generation of the drive signal; and d) applying the motor drive signal to the motor to operate the motor.

3. A motor control system comprising:

a single phase induction motor;

a controllable power switching circuit; and a controller coupled to the power switching circuit, the controller controlling the power switching circuit to generate a square wave motor drive signal to drive the motor at other than its rated frequency, the controller generating the square wave motor drive signal such that one or more of harmonics are suppressed and/or eliminated.

4. A motor control system comprising:

a single phase induction motor having at least one stator winding;

a motor drive circuit configured to drive the motor at other than its rated frequency with a square wave motor drive signal applied to the at least one stator winding;

a controllable power switching circuit including a plurality of switches; and a controller coupled to the power switching circuit, the controller controlling switching of switches in the power switching circuit to generate the square wave motor drive signal which is applied to the at least one stator winding wherein the controller effectively generates the square wave motor drive signal such that one or more harmonics are suppressed and/or eliminated.

5. A motor control system:

a single phase induction motor having at least one winding;

a controllable motor drive circuit configured to be coupled between an alternating current power source and the single phase induction motor, the controllable motor drive circuit including a plurality of power transistor switches configured to generate a square wave motor drive signal and apply the square wave motor drive signal to the at least one winding;

a microcomputer circuit; and a gate drive circuit coupled between the microcomputer circuit and the power transistor switches wherein the microcomputer supplies signals to the gate drive circuit such that the power transistor switches generate the square wave motor drive signal, wherein the microcomputer circuit is operatively configured to generate the square wave motor drive signal with a notch to suppress a harmonic component of the square wave motor drive signal.

* * * * *